: US010933379B2

(12) United States Patent
Han

(10) Patent No.: US 10,933,379 B2
(45) Date of Patent: Mar. 2, 2021

(54) PLATE-TYPE FILTER MODULE FOR WATER TREATMENT AND FILTER ASSEMBLY FOR WATER TREATMENT COMPRISING SAME

(71) Applicant: AMOGREENTECH CO., LTD., Gimpo-si (KR)

(72) Inventor: Kyung Gu Han, Gimpo-si (KR)

(73) Assignee: Amogreentech Co., Ltd., Gimpo-si (KR)

(*) Notice: Subject to any disclaimer, the term of this patent is extended or adjusted under 35 U.S.C. 154(b) by 0 days.

(21) Appl. No.: 16/323,854

(22) PCT Filed: Aug. 7, 2017

(86) PCT No.: PCT/KR2017/008480
§ 371 (c)(1),
(2) Date: Feb. 7, 2019

(87) PCT Pub. No.: WO2018/030725
PCT Pub. Date: Feb. 15, 2018

(65) Prior Publication Data
US 2019/0209972 A1   Jul. 11, 2019

(30) Foreign Application Priority Data
Aug. 11, 2016  (KR) .......................... 10-2016-0102330

(51) Int. Cl.
*B01D 63/08* (2006.01)
*B01D 65/08* (2006.01)
(Continued)

(52) U.S. Cl.
CPC ........... *B01D 63/082* (2013.01); *B01D 63/08* (2013.01); *B01D 65/08* (2013.01); *B01D 69/06* (2013.01); *C02F 1/44* (2013.01)

(58) Field of Classification Search
CPC .. B01D 63/08; B01D 63/082; B01D 2321/18; B01D 2321/185; B01D 2319/04;
(Continued)

(56) References Cited

U.S. PATENT DOCUMENTS 6,790,360 B1 * 9/2004 Pedersen ................ B01D 65/02
                                                                210/636
2013/0075322 A1   3/2013 Lee Wang
(Continued)

FOREIGN PATENT DOCUMENTS

EP   2228124 A1   9/2010
EP   2422871 A1   2/2012
(Continued)

OTHER PUBLICATIONS

International Search Report in PCT/KR2017/008480 dated Nov. 29, 2017, 2 pgs.

*Primary Examiner* — Benjamin M Kurtz
(74) *Attorney, Agent, or Firm* — Rothwell, Figg, Ernst & Manbeck, P.C.

(57) ABSTRACT

Provided are a plate-type filter module for water treatment and a filter assembly for water treatment comprising the same. The plate-type filter module for water treatment according to one embodiment of the present invention comprises: a plurality of filter units having a predetermined area and formed in a plate shape; a block frame to which the plurality of filter units is engaged so that the filter units are kept parallel to each other; and a collecting/receiving tube fixed on one side of the block frame and including a plurality of first fittings respectively connected to the plurality of the filter units to allow filtered water produced in the filter units to be introduced thereinto and at least one second fitting for discharging the filtered water introduced through the plurality of first fittings to the outside.

15 Claims, 22 Drawing Sheets

(51) Int. Cl.
  *B01D 69/06* (2006.01)
  *C02F 1/44* (2006.01)
  *B01D 69/12* (2006.01)

(58) Field of Classification Search
  CPC ............ B01D 2315/06; B01D 2313/06; B01D 2313/02; B01D 2313/025; B01D 2313/56
  See application file for complete search history.

(56) References Cited

U.S. PATENT DOCUMENTS

| | | | |
|---|---|---|---|
| 2013/0146518 A1 | 6/2013 | Suk | |
| 2013/0221546 A1 | 8/2013 | Christ | |
| 2015/0329381 A1* | 11/2015 | Kitanaka | B01D 63/082 210/209 |

FOREIGN PATENT DOCUMENTS

| | | |
|---|---|---|
| EP | 2873650 A1 | 5/2015 |
| EP | 2926887 A1 | 10/2015 |
| JP | 2001029952 A | 2/2001 |
| KR | 100459037 B1 | 12/2004 |
| KR | 10-2006-0007874 A | 1/2006 |
| KR | 10-2007-0071772 | 7/2007 |
| KR | 10-2009-0037557 | 4/2009 |
| KR | 10-2010-0000200 | 1/2010 |
| KR | 10-2012-0133600 | 12/2012 |
| KR | 10-2012-0133601 A | 12/2012 |
| KR | 10-2014-0103866 A | 8/2014 |

* cited by examiner

PLATE-TYPE FILTER MODULE FOR WATER TREATMENT AND FILTER ASSEMBLY FOR WATER TREATMENT COMPRISING SAME

CROSS REFERENCE TO RELATED APPLICATIONS

This application is the national phase entry of International Application No. PCT/KR2017/008480, filed on Aug. 7, 2017, which is based upon and claims priority to Korean Patent Application 10-2016-0102330, filed on Aug. 11, 2016. The entire contents of which are incorporated herein by reference.

TECHNICAL FIELD

The present invention relates to a plate-type filter module for water treatment and a filter assembly for water treatment including the same.

BACKGROUND

In general, as industry has developed rapidly and population has been concentrated in cities, urban sewage and industrial wastewater have increased. The increase of sewage and wastewater is a big problem in modern society, and various sewage and wastewater treatment facilities for economically and efficiently processing the sewage and the wastewater are presented.

A plurality of filters may be provided in the sewage and the wastewater treatment facilities to filter the sewage and the wastewater, and the wewage and the wastewater is filtered through a filter member included in each filter.

Here, in a case in which the filter is formed in a plate type having a certain area, a frame configured to support the filter member may be fastened to an edge side of the filter member. The frame may be fixed to the edge side of the filter member through an adhesive member.

However, when an amount of the adhesive member for connecting the frame to the filter member is not sufficient, an adhesive force is insufficient such that the frame may be separated from the filter member.

Meanwhile, filters installed in conventional sewage or wastewater treatment facilities are connected to each other, and thus have a structure that may not be partially replaced during operation.

Thus, in a case in which a part of the plurality of filters is replaced, or a cleaning operation is required, the operation of the entire system should be stopped.

SUMMARY OF THE INVENTION

The present invention is directed to providing a plate-type filter module for water treatment which is capable of increasing assembly productivity and allows replacement or maintenance work without stopping an entire system by configuring the filter module in one block unit, and a filter assembly for water treatment including the same.

The present invention is also directed to providing a plate type filter unit for water treatment capable of enhancing airtightness and structural rigidity against backwash pressure by allowing a sufficient amount of an adhesive member to be accommodated between surfaces of a filter member and a support frame, which are facing each other.

One aspect of the present invention provides a plate-type filter module for water treatment including a plurality of filter units formed in a plate shape having a certain area, a block frame to which the plurality of filter units are respectively fastened so that a state of being arranged in parallel to each other is maintained, and a receiving and collecting tube fixed to one side of the block frame, wherein the receiving and collecting tube includes a plurality of first fittings connected to the plurality of filter units in a one-to-one manner to allow filtered water produced in each filter unit to be introduced therethrough and at least one second fitting configured to discharge the filtered water introduced through the plurality of first fittings to the outside.

The block frame may include a front frame and a rear frame, which are formed of a frame structure, and a plurality of fastening bars connecting the front frame and the rear frame.

The block frame may include at least one horizontal checking frame connecting a pair of fastening bars facing each other, and the horizontal checking frame may include a horizontal surface configured to check whether the fastening bars are sagged or not.

Each of the filter units may include at least one fastening hole, and the plurality of filter units may be fixed to the block frame through one fastening bar passing through the fastening hole.

The receiving and collecting tube may include an opening and closing valve configured to open and close the second fitting.

The block frame may be provided with at least one handle attachable by a user.

Each of the filter units may include a filter member formed in a plate shape having a certain area, a support frame which is coupled to an edge side of the filter member such that the filter member is maintained in the plate shape and includes a flow path therein through which the filtered water produced through the filter member is introduced and moves, and at least one receiving port configured to discharge the filtered water introduced into the flow path to the outside.

The filter member may include a first support, and a nanofiber web formed of nanofibers on at least one surface of the first support.

A pair of filter units disposed on the outermost positions among the plurality of filter units may not be connected to the receiving and collecting tube.

Another aspect of the present invention provides a filter assembly for water treatment including at least one plate-type filter module for water treatment described above, and a fixing frame to which the plate-type filter module for water treatment is detachably coupled.

The fixing frame may include at least two guide rails configured to support a lower edge side of the plate-type filter module for water treatment and guide a sliding movement of the plate-type filter module for water treatment, and a bar-shaped guide bar may be provided on the side of the guide rail along a sliding direction of the filter module to reduce a contact area with the plate-type filter module for water treatment.

The guide bar may have a front end formed with an inclined surface to allow the plate-type filter module for water treatment to be easily slide in.

A first through hole and a second through hole may be formed to pass through the block frame and the fixing frame, in the regions corresponding to each other, to allow a fastening member to pass simultaneously therethrough, and the sliding movement of the filter module may be restricted through the fastening member simultaneously inserted into the first through hole and the second through hole.

The fixing frame may include a plurality of mounting spaces configured to respectively accommodate the plurality of plate-type filter modules for water treatment, and in the plurality of filter modules respectively fastened to the plurality of mounting spaces, receiving and collecting tubes may be connected to one main collecting tube fixed to the fixing frame in a one-to-one manner so that filtered water collected in the receiving and collecting tubes moves toward the main collecting tube.

The filter assembly for water treatment may further include an air diffuser disposed on a lower portion of the plate-type filter module for water treatment and configured to eject bubbles toward the plate-type filter module for water treatment using air supplied from the outside.

The air diffuser may be provided with a hollow tube having a plurality of ejection holes and being mounted on the fixing frame.

The air diffuser may be provided in a plate shape having pores of a certain size and detachably coupled to the block frame.

The air diffuser may include a nanofiber web having micropores.

According to the present invention, a filter module can be separated and mounted individually by configuring the filter module in one block unit, thereby increasing assembly productivity.

Further, according to the present invention, an operation of a corresponding filter module can be interrupted, or the corresponding filter module can be replaced without stopping an operation of an entire system, thereby increasing production yield.

Further, according to the present invention, a cleaning effect can be enhanced, and an amount of fouling generated can be reduced by supplying bubbles toward each filter unit through an air diffuser Further, according to the present invention, structural rigidity against backwash pressure and airtightness can be enhanced by allowing a sufficient amount of an adhesive member to be accommodated between surfaces of a filter member and a support frame, which are facing each other.

BRIEF DESCRIPTION OF THE DRAWINGS

FIGS. 5A to 5D are views illustrating various shapes of a frame that may be applied to FIG. 4, wherein FIG. 5A is a cross-sectional view illustrating a basic shape of the frame, and FIGS. 5B to 5D are cross-sectional views and partial cutaway views illustrating shapes in which an accommodation space is formed.

FIGS. 7A and 7B are views illustrating a coupling relationship between the coupling member and a support frame, which are applied to the filter unit according to the present invention, wherein FIG. 7A is a view illustrating a state in which the coupling member is separated from the support frame, and FIG. 7B is a view illustrating a state in which the coupling member is coupled to the support frame.

DETAILED DESCRIPTION OF THE INVENTION

Figure 1:
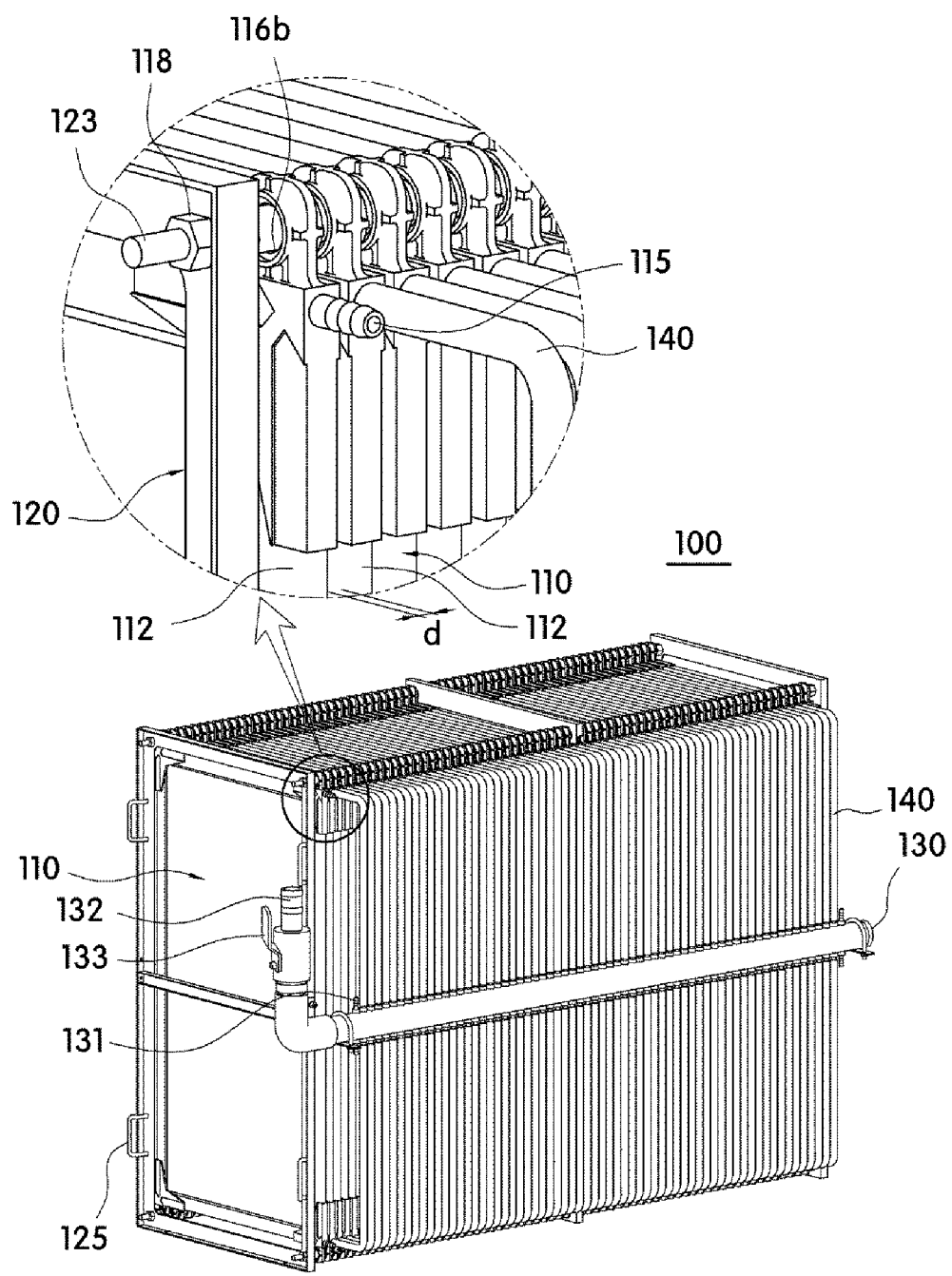
FIG. 1 is a view illustrating a water treatment plate-type filter module according to one embodiment of the present invention.

Exemplary embodiments of the present invention will be described in detail below with reference to the accompanying drawings so that those skilled in the art can easily embody the invention. The invention can be embodied in several different forms and is not limited to embodiments that will be described below. In the drawings, for clarity, irrelevant portions to descriptions are omitted, and the same reference numerals throughout the specification are used for the same or similar components or elements.

Figure 10:
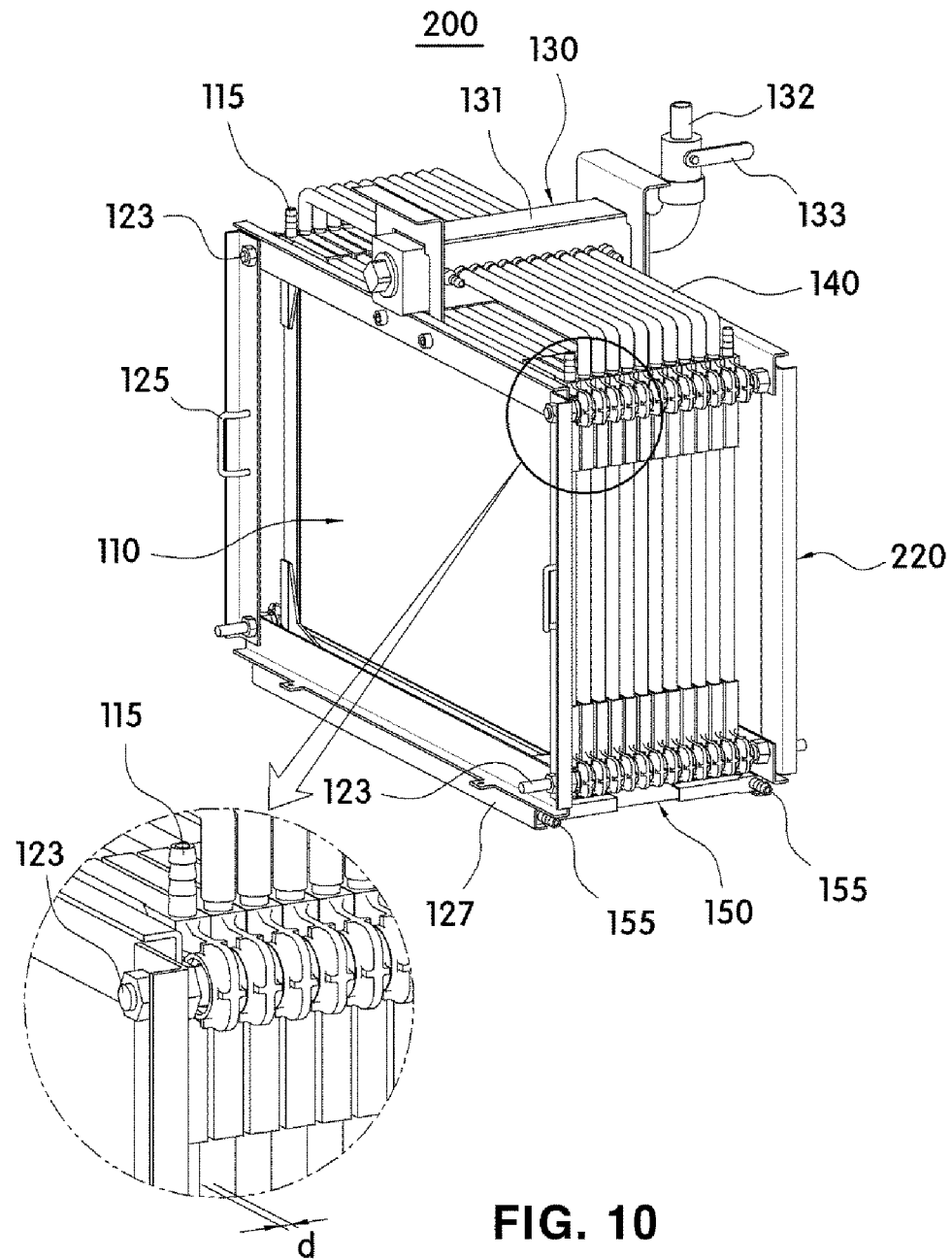
FIG. 10 is a view illustrating a water treatment plate-type filter module according to another embodiment of the present invention.

As shown in FIGS. 1 and 10, a water treatment plate-type filter module 100 or 200 according to one embodiment of the present invention includes a filter unit 110, a block frame 120 or 220, and a receiving and collecting tube 130.

The filter unit 110 is configured to produce filtered water by filtering out foreign substances from a liquid to be filtered, such as sewage or wastewater.

The filter unit 110 may be provided in plural and include at least one receiving port 115 through which a fluid such as air, filtered water, washing water, or the like may flow in and out. Accordingly, in a case in which a suction force is provided through the receiving port 115 from the outside, the filter unit 110 may produce the filtered water by suctioning the liquid to be filtered, and the produced filtered water may be discharged to the outside through the receiving port 115.

Further, the plurality of filter units 110 may each be in the form of a plate shape having a certain area and may be arranged in parallel with each other. Through this, an integration density may be increased, and a large amount of filtered water may be produced through a single process.

Here, by fastening the plurality of filter units 110 to the block frame 120 or 220, a state in which the plurality of filter units 110 are arranged in parallel to each other may be maintained, and as shown in FIGS. 1 and 10, a certain gap d may be formed between filter members 111 of the filter units 110 adjacent to each other.

Thus, the liquid to be filtered may be introduced into a space formed by the gap and brought into contact with each filter member 111 provided in the plurality of filter units 110 so that the filtered water may be simultaneously produced in each filter unit 110.

Meanwhile, the block frame 120 or 220 may be a plate-shaped member but may have a frame structure whose front surface is open so that the liquid to be filtered may be smoothly introduced into the plurality of filter units 110.

Figure 2:
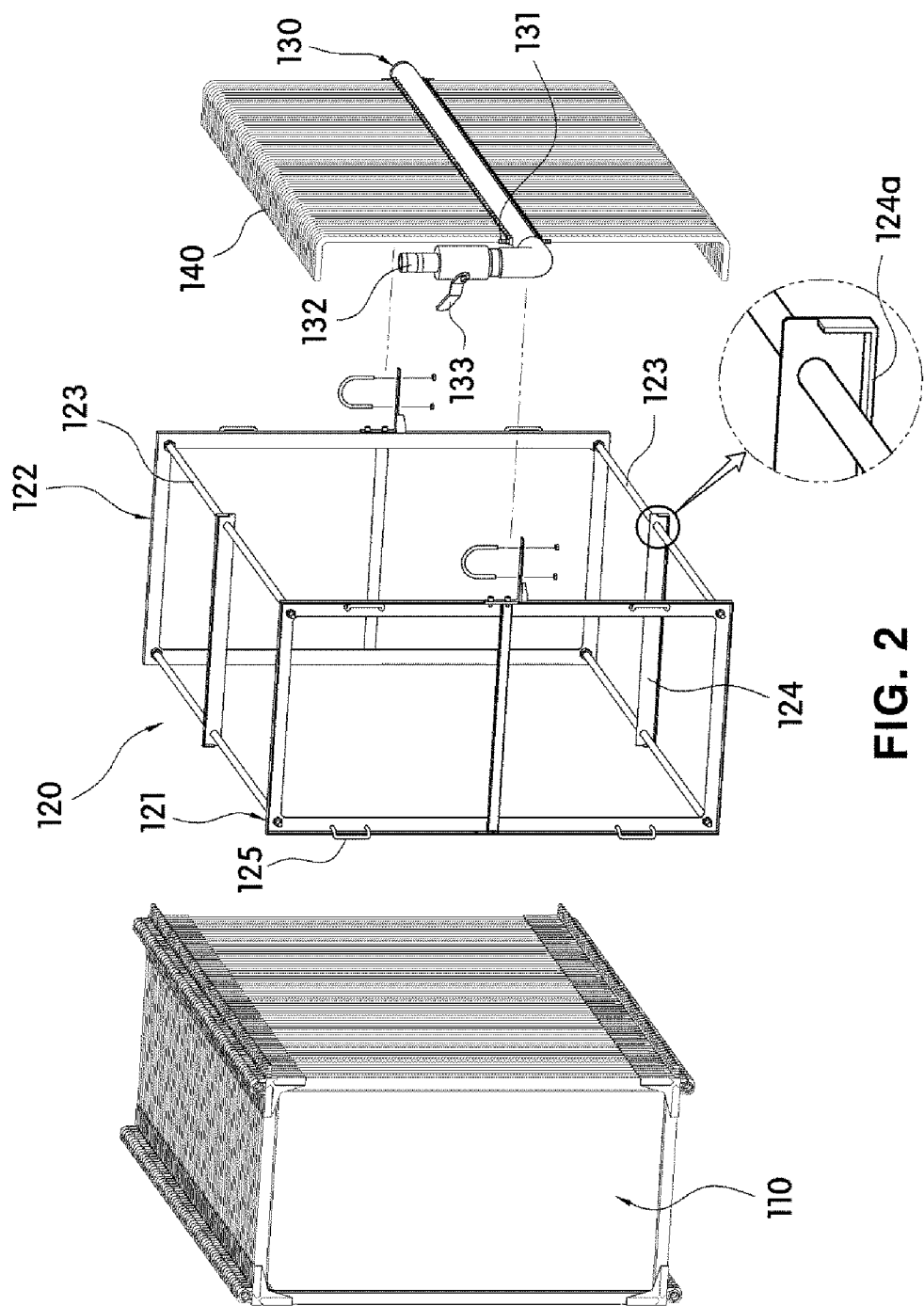
FIG. 2 is an exploded view of FIG. 1.
Figure 11:
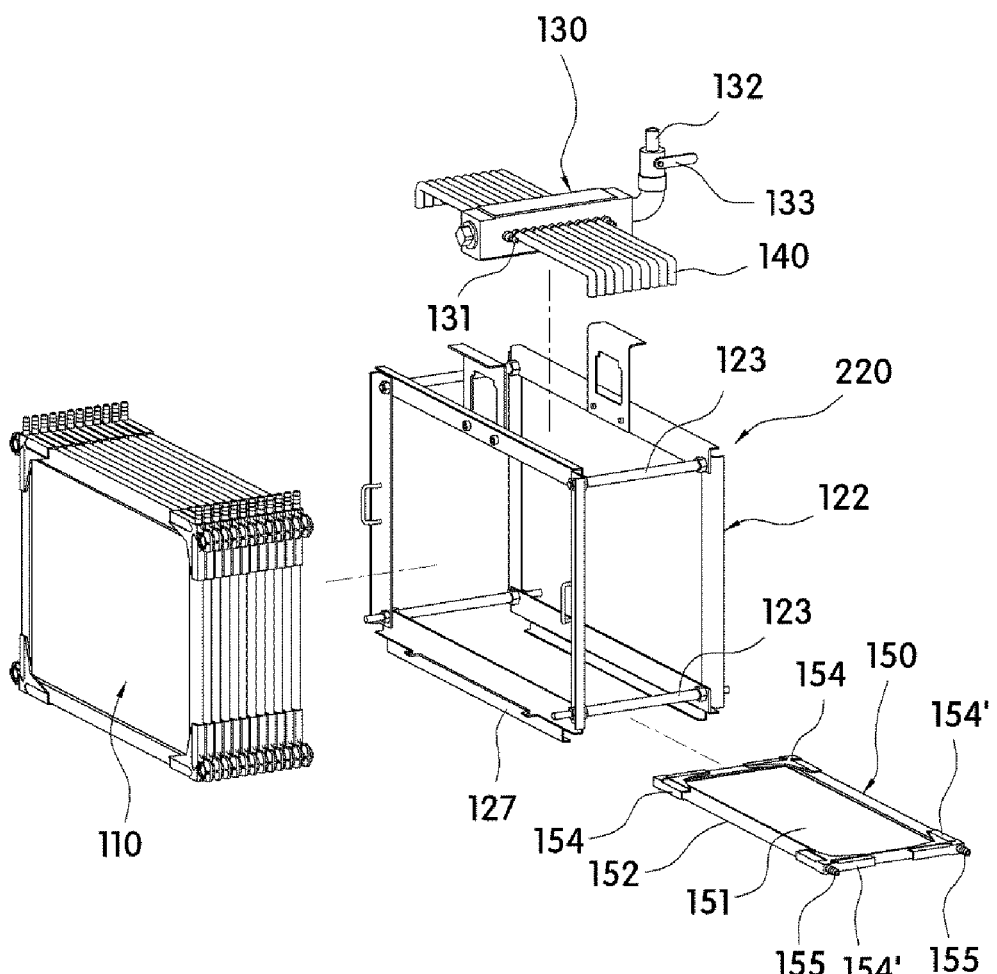
FIG. 11 is an exploded view of FIG. 10.

For example, as shown in FIGS. 2 and 11, the block frame 120 or 220 may include a front frame 121 and a rear frame 122, which are formed of a frame structure, and may have a form in which the front frame 121 and the rear frame 122 are coupled to both end sides of fastening bars 123 each having a certain length.

Here, at least one of the front frame 121 and the rear frame 122 may be detachably coupled to the fastening bar 123, and thus the plurality of filter units 110 may be detachably fastened to the fastening bar 123.

For example, as shown in FIGS. 1 and 10, the filter unit 110 may include a fastening hole 116b through which the fastening bar 123 may pass, and the fastening bar 123 may be inserted into the fastening hole 116b. Accordingly, the plurality of filter units 110 may be detachably coupled to the block frame 120 or 220 by inserting one fastening bar 123 into the fastening hole 116b so as to pass simultaneously through the fastening holes 116b formed in the filter units 110.

Here, fastening holes into which end sides of the fastening bar 123 are inserted may be provided on sides of the front frame 121 and the rear frame 122 so that the fastening bar 123 may be inserted thereinto in a fitting manner, and through holes may be formed in the front frame 121 and the rear frame 122 so that the fastening bar 123 may be fixed by a separate fixing member 118 in a state in which both ends of the fastening bar 123 pass therethrough.

Further, each member constituting the front frame 121 and the rear frame 122 may be a plate-shaped bar having a certain width and length, may be an 'I-shaped' beam or an "L-shaped" beam, or may be provided in the form of a square tube.

As described above, the plurality of filter units 110 formed in a plate shape are all fastened to and supported by one fastening bar 123 so that the water treatment plate-type filter module 100 or 200 according to the present invention may be integrated through the block frame 120 or 220 and the state in which the filter units 110 are arranged in parallel with each other may be maintained.

Accordingly, the suction force provided from the outside, for example, a suction force provided from one pump (not shown) is transferred toward the filter unit 110 through each receiving port 115 so that the filtered water may be separately produced in each filter unit 110.

Here, as shown in FIGS. 2 and 11, the block frame 120 or 220 may include at least one horizontal checking frame 124 connected to a pair of fastening bars 123 facing each other. By forming at least one surface of the horizontal checking frame 124 to have a horizontal surface 124a, a worker may easily check whether the fastening bar 123 is sagged or not when the plurality of filter units 110 are fastened to the block frame 120 or 220.

The receiving and collecting tube 130 is configured to collect the filtered water produced by the suction force in each filter unit 110 into one, in addition to simultaneously supplying the suction force for producing the filtered water toward the plurality of filter units 110 integrated through the block frame 120 or 220.

To this end, as shown in FIGS. 1 and 10, the receiving and collecting tube 130 may be connected to the receiving port 115 of each filter unit 110 through a connecting tube 140 in a one-to-one manner such that the suction force provided from the outside may be simultaneously transferred toward each filter unit 110. Thus, each of the filter units 110 may individually produce the filtered water using the suction force transferred through the receiving port 115, and the filtered water individually produced in each filter unit 110 may be collected toward the receiving and collecting tube 130 by the suction force.

For example, the receiving and collecting tube 130 may be in the form of a hollow tube having a certain length and may include a plurality of first fittings 131 connected to the receiving port 115 provided in each filter unit 110 through the connecting tube 140 and at least one second fitting 132 configured to discharge the filtered water introduced through the plurality of first fittings 131 to the outside or to supply the suction force provided from the outside toward the plurality of first fittings 131.

Thus, in the water treatment plate-type filter module 100 or 200 according to the present invention, the suction force provided from the outside may be introduced into the hollow tube through the second fitting 132 of the receiving and collecting tube 130 and then transferred toward each filter unit 110 through the plurality of first fittings 131, and the filtered water produced in each filter unit 110 may be moved and collected in the hollow tube through the first fitting 131 and then discharged to the outside through the second fitting 132.

Here, the first fitting 131 may be connected to the receiving port 115 provided in each filter unit 110 through the connecting tube 140 in a one-to-one manner, but the receiving and collecting tube 130 may also be directly connected to the plurality of receiving ports 115.

Further, a pair of filter units 110 disposed at the outermost positions of the plurality of filter units 110 fastened to the block frame 120 or 220 may not be connected to the receiving and collecting tube 130 (refer to FIGS. 1 and 11). Thus, the pair of filter units 110 disposed at the outermost positions among the plurality of filter units 110 may not produce the filtered water and may block foreign substances or the like having a large size among the foreign substances included in the liquid to be filtered from moving toward the remaining filter units, thereby blocking the remaining filter units for producing the filtered water from being damaged or severely contaminated by the foreign substances.

Here, the receiving and collecting tube 130 may be fixed to one side of the block frame 120 or 220. That is, in the water treatment plate-type filter module 100 or 200 according to the present invention, the receiving and collecting tube 130 may be configured as one unit-module through the block frame 120 or 220 together with the plurality of filter units 110.

The receiving and collecting tube 130 may vary according to a position of the receiving port 115 and a shape of the filter unit 110 and may be fixed to a side portion of the block frame 120 or 220 as shown in FIG. 1 or an upper portion of the block frame 120 or 220 as shown in FIG. 10.

Here, a separate handle 125 may be provided on one side of the block frame 120 or 220 so that a user or worker may easily handle the water treatment plate-type filter module 100 or 200, which is modularized in a block unit, and an opening and closing valve 133, which is configured to allow or block an introduction of the fluid, may be provided on the side of the second fitting 132.

Accordingly, when a plurality of water treatment plate-type filter modules 100 or 200 according to the present invention are applied to one water treatment system, the water treatment system may be completed by interconnecting the water treatment plate-type filter modules 100 or 200, which are implemented in the form of a unit module, thereby reducing an installation time and easily installing a large-scale water treatment system.

In addition, in a case in which it is necessary to selectively stop production of the filtered water from one of the pluralities of water treatment plate-type filter modules, it is possible to selectively stop the production of the filtered water of the corresponding water treatment plate-type filter module among the plurality of water treatment plate-type filter modules without stopping the operation of the entire system.

Thus, it is possible to separate and replace the water treatment plate-type filter module that requires replacement among the plurality of water treatment plate-type filter modules, and a backwashing process may be individually performed on the water treatment plate-type filter module having severe contamination among the plurality of water treatment plate-type filter modules.

Therefore, even when the production of the filtered water in one water treatment plate-type filter module among the plurality of water treatment plate-type filter modules is stopped, the remaining water treatment plate-type filter modules may be maintained in an operation state, thereby minimizing a drop in production yield. In addition, even when the production of the filtered water in one water treatment plate-type filter module among the plurality of water treatment plate-type filter modules is stopped, the remaining water treatment plate-type filter modules may be maintained in the operation state so that the filtered water may be continuously produced, and a backwashing operation for recovering the performance of the pluralities of water treatment plate-type filter modules may be sequentially performed.

Meanwhile, the filter unit 110 applicable to the above-described water treatment plate-type filter module 100 or 200 may be implemented in the form of a plate shape.

Figure 3:
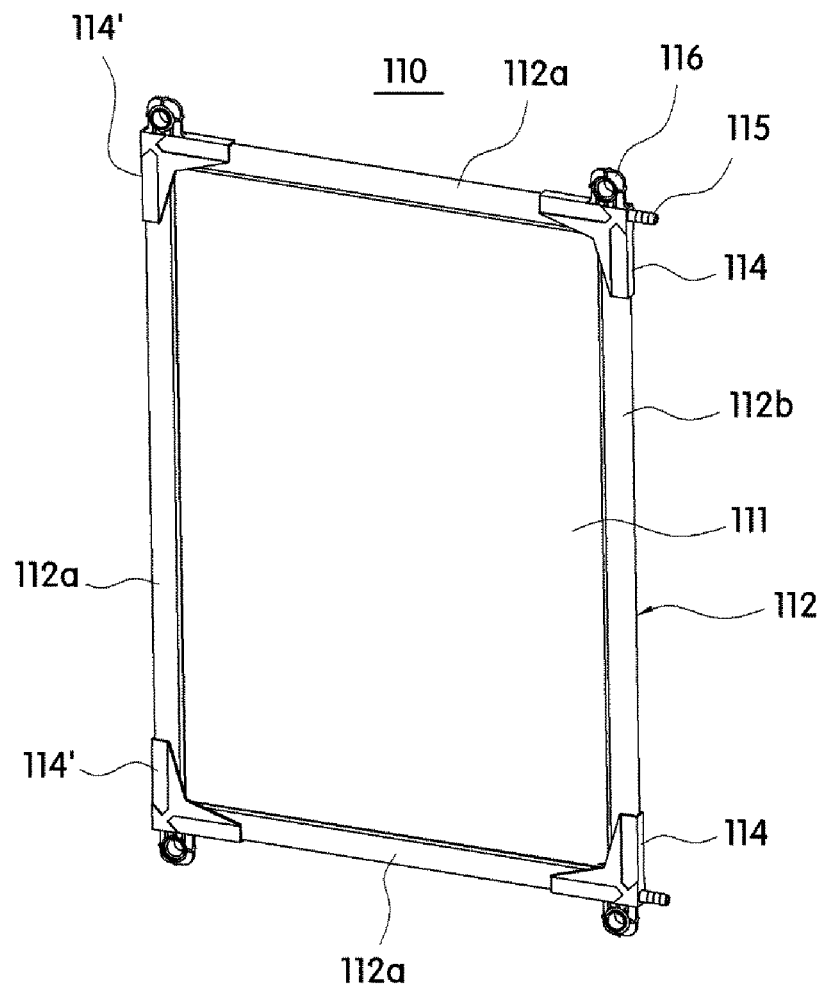
FIG. 3 is a view illustrating a filter unit applicable to the water treatment plate-type filter module according to the present invention.
Figure 4:
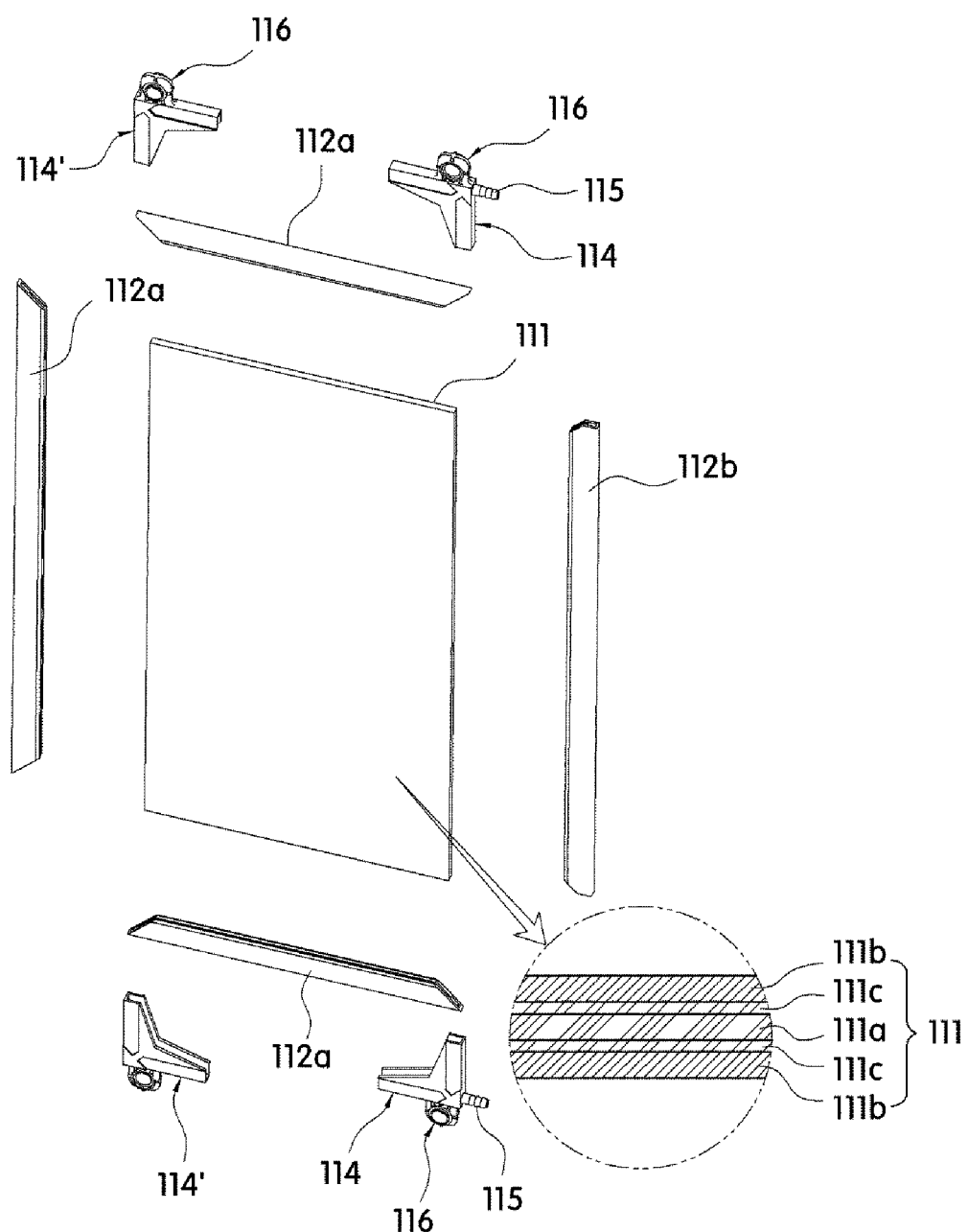
FIG. 4 is an exploded view of FIG. 3.

For example, as shown in FIGS. 3 and 4, the filter unit 110 may include the filter member 111, a support frame 112, and the receiving port 115.

The filter member 111 is configured to filter foreign substances included in the liquid to be filtered such as sewage or wastewater and may be in the form of a plate shape having a nanofiber web 111b disposed on at least one surface of a first support 111a (see an enlarged view of FIG. 4) although a known filter member formed in a plate shape may be used as the filter member 111.

Here, the nanofiber web 111b may filter the foreign substances included in the liquid to be filtered while the liquid to be filtered passes therethrough by a suction pressure, and the first support 111a may support the nanofiber web 111b and serve as a movement path through which the filtered water produced by the nanofiber web 111b moves.

Further, the filter member 111 may have a two- or three-layer structure in which the nanofiber web 111b is directly attached to one surface or both surfaces of the first support 111a.

In addition, the filter member 111 may have a five-layer structure in which the nanofiber web 111b is attached to each of both surfaces of the first support 111a through a second support 111c. Here, in order to reduce an overall thickness of the filter member 111, the second support 111c may have a thickness that is relatively thinner than a thickness of the first support 111a and may be laminated on one surface of the first support 111a. In this case, in the filter member 111, the nanofiber web 111b may have an improved adhesion and may be more easily attached to the first support 111a by being attached to the first support 111a through the second support 111c compared with a case in which the nanofiber web 111b is directly attached to the first support 111a.

For example, the nanofiber web 111b may be attached to the first support 111a through the second support 111c using thermal fusion, ultrasonic fusion, and high-frequency fusion, and the second support 111c may be partially melted or completely melted during the attachment process. Here, the nanofiber web 111b may have a higher melting temperature than a process temperature that is performed during a fusing process so as not to be melted by heat, and the second support 111c may be provided to have a melting temperature lower than the process temperature that is performed during the fusing process. Accordingly, the filter member 111 may be implemented in the three-layer structure when the second support 111c is completely melted, and the filter member 111 may be implemented in the five-layer structure when a part of the second support 111c is melted and remains between the nanofiber web 111b and the first support 111a.

However, the structure of the filter member 111 is not limited thereto, and it should be noted that the present invention is not limited to a configuration as long as one or more support layers are interposed between two nanofiber webs 111b.

Meanwhile, the first support 111a and the second support 111c may be porous base materials to serve as the movement path through which the filtered water produced by the nanofiber web 111b moves.

For example, the first support 111a and/or the second support 111c may be one of known woven fabrics, knitted fabrics, and nonwoven fabrics, which are commonly used. Herein, the woven fabric means that the fiber included in the woven fabric has vertical and horizontal orientations, the specific structure may be a plain weave, a twill weave, or the like, and density of a warp yarn and a suing yarn is not particularly limited. Further, the knitted fabric may be a known knit structure and may be a weft knitted fabric, a warp knitted fabric, or the like, but the present invention is not particularly limited thereto. The nonwoven fabric may include a known nonwoven fabric such as a dry-laid nonwoven fabric such as a chemical bonding nonwoven fabric, a thermal bonding nonwoven fabric, and an air-laid nonwoven fabric, a wet-laid nonwoven fabric, a spun lace nonwoven fabric, a needle punching nonwoven fabric or a melt blown nonwoven fabric, and it should be noted that a pore diameter, a porosity and basis weight of the nonwoven fabric may vary depending on the desired water permeability, filtration efficiency, and mechanical strength.

That is, the material of the first support 111a and/or the second support 111c is not limited, and as a non-limiting example, synthetic fibers selected from the group consisting of polyester, polypropylene, nylon, and polyethylene, or natural fibers including cellulosic fibers may be used.

However, the first support 111a and the second support 111c may be formed of a material capable of preventing the separation of the nanofiber web 111b and the first support 111a and/or the second support 111c during the water treatment process by improving a binding force with the nanofiber web 111b, and preventing problems such as a decrease in water permeability due to use of a separate adhesive component.

For example, the first support 111a and the second support 111c may include a low-melting-point polymer compound such as a known low-melting-point polyester and a known low-melting-point polyethylene, which may be thermally fused and may be a polyester-based low-melting-point composite fiber having a low-melting-point polyester as a sheath and a polyethylene terephthalate as a core and/or a polyolefin-based low-melting-point composite fiber having a low-melting-point polyethylene as a sheath and a polypropylene as a core.

Meanwhile, the second support 111c may be made of a material different from that of the first support 111a but may be made of the same material as the first support 111a to increase adhesion with the first support 111a.

The nanofiber web 111b is configured to implement a filter function in which foreign substances included in the liquid to be filtered are filtered and may be formed of nanofibers, and may be a web formed in a three-dimensional network structure through the nanofibers. Here, the nanofiber may include a fiber-forming component including polyacrylonitrile (PAN) and polyvinylidene fluoride (PVDF) and include an emulsifying agent for enhancing miscibility of the fiber forming component. Here, the fiber-forming component may include polyacrylonitrile (PAN, hereinafter referred to as PAN) having high hydrophilicity and include hydrophilic polyvinylidene fluoride (PVDF, hereinafter referred to as PVDF) having very high hydrophobicity.

The PVDF may secure the mechanical strength and chemical resistance of the nanofiber due to the nature of the material, and the PAN is highly hydrophilic so as to prevent hydrophobization of the nanofibers due to the PVDF and improves the hydrophilicity of the nanofibers to exhibit enhanced water permeability when the nanofibers are attached to the filter member.

The nanofiber web 111b may be provided as a single layer or multiple layers.

The support frame 112 may be coupled to an edge side of the filter member 111 to support the edge side of the filter member 111. Thus, the filter member 111 of the filter unit 110 may be maintained in the form of a plate shape.

The support frame 112 may be formed of a single member to fully or partially support the edge side of the filter member 111, but as shown in FIG. 4, the support frame 112 may be configured in a form in which a plurality of frames 112a and 112b are coupled to the edge side of the filter member 111.

For example, the plurality of frames 112a and 112b may be disposed on the edge side of the filter member 111 such that an end of one frame is in contact with an end of the other frame, and a state in which end sides of two adjacent frames 112a and 112b are connected to each other may be maintained by coupling members 114 and 114' coupled to corner sides of the filter member 111.

However, it should be noted that the shape of the support frame is not limited thereto and may be changed into various shapes such as a circular shape, an arcuate shape, a polygonal shape, and a combination thereof according to the shape of the filter member 111, and any shape may be used as long as it entirely surrounds the edge of the filter member.

Here, the support frame 112 may perform the role of supporting the filter member 111 in the plate shape and the role of a flow path for moving the filtered water produced by the filter member 111 toward the receiving port 115 using the suction force provided from the outside.

To this end, each of the frames 112a and 112b constituting the support frame 112 may have an approximately C-shaped cross-section having one side thereof opened so that a flow path 113, through which the filtered water introduced from the filter member 111 moves, may be formed therein.

In more detail, as shown in FIGS. 5A to 5D, the plurality of frames 112a and 112b may include a first plate 114a having a plate shape and a pair of second plates 114b each extending from the first plate 114a in a direction perpendicular to the first plate 114a.

Thus, the edge side of the filter member 111 may be inserted into a space formed between the pair of second plates 114b so that the filter member 111 may be supported by the pair of second plates 114b facing each other. Here, an end of the edge of the filter member 111 may be inserted into the space formed between the pair of second plates 114b so as to be spaced apart from the first plate 114a by a certain distance.

That is, constraining members 114c configured to restrict an insertion depth of the filter member 111 may be provided on opposite surfaces of the pair of second plates 114b facing each other.

Thus, the certain space may be formed between the end of the edge side of the filter member 111 and the first plate 114a by restricting the insertion depth of the filter member 111 through the constraining members 114c in the process of fastening the edge side of the filter member 111 to each of the frames 112a and 112b.

Accordingly, when the filter member 111 is coupled to the frames 112a and 112b, the state in which the edge of the filter member 111 is spaced apart from the first plate 114a may be always maintained so that the flow path 113 through which the fluid moves may be formed.

In the present invention, the constraining member 114c may be formed on each of the opposite surfaces of the pair of second plates 114b facing each other but may be formed only on an inner surface of one of the pairs of second plates 114b. In addition, the constraining member 114c may be entirely or partially provided along a lengthwise direction of each frame. Further, in a case in which the constraining members 114c are formed on the opposite surfaces of the pair of second plates 114b facing each other, each of the constraining members 114c may be disposed to be spaced apart from each other with a certain gap so that the filtered water may be moved toward the flow path 113 through the gap.

Meanwhile, the support frame 112 may be fixed to the edge side of the filter member 111 through an adhesive member B.

Here, in the filter unit 110, an accommodation space forming part may be provided on the side of the support frame 112 to increase a coupling force between the filter member 111 and the support frame 112, thereby increasing structural rigidity.

Figure 5A:
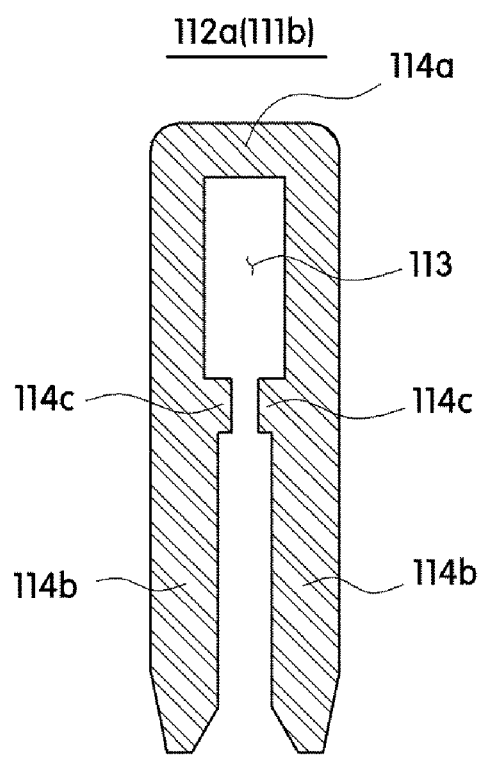
Figure 5B:
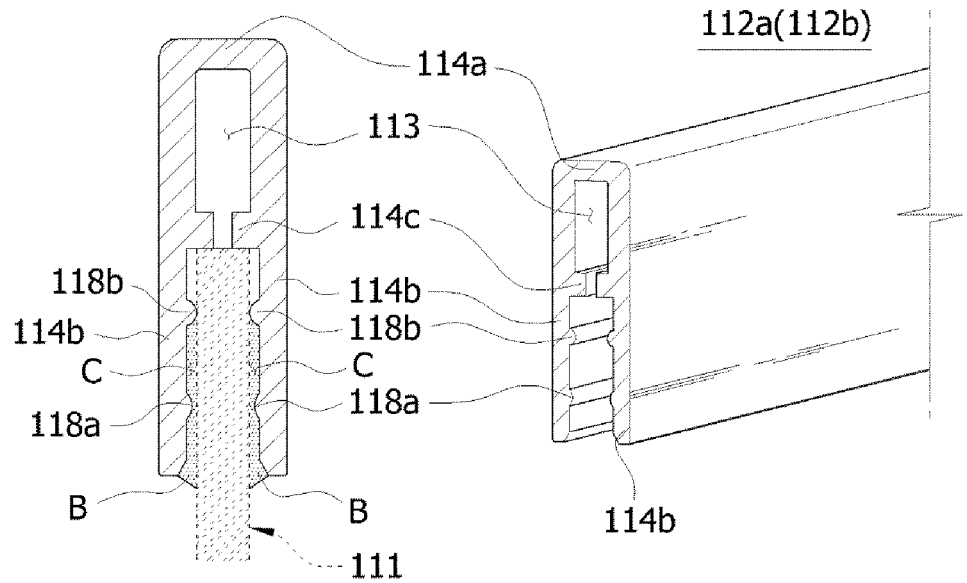
Figure 5C:
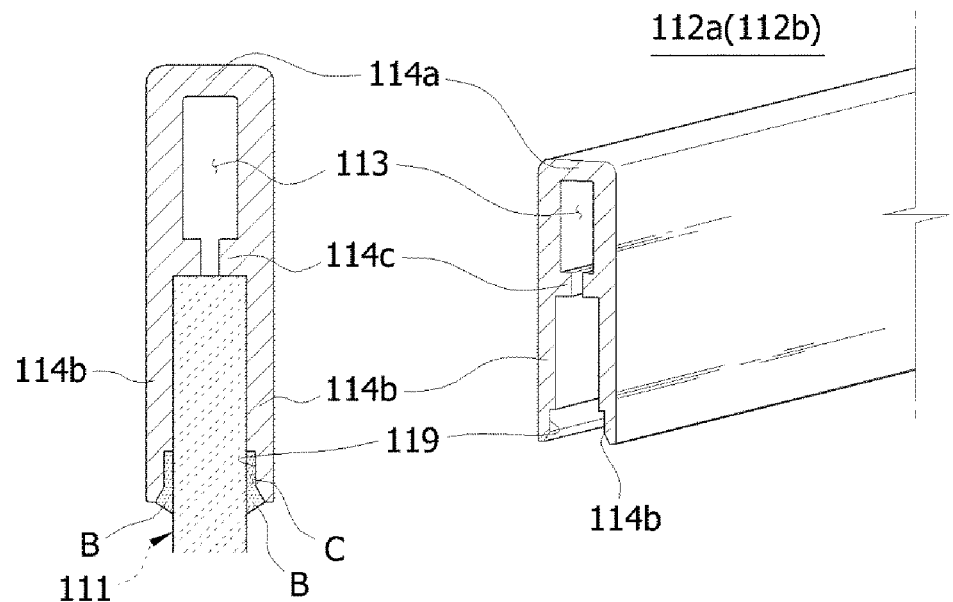
Figure 5D:
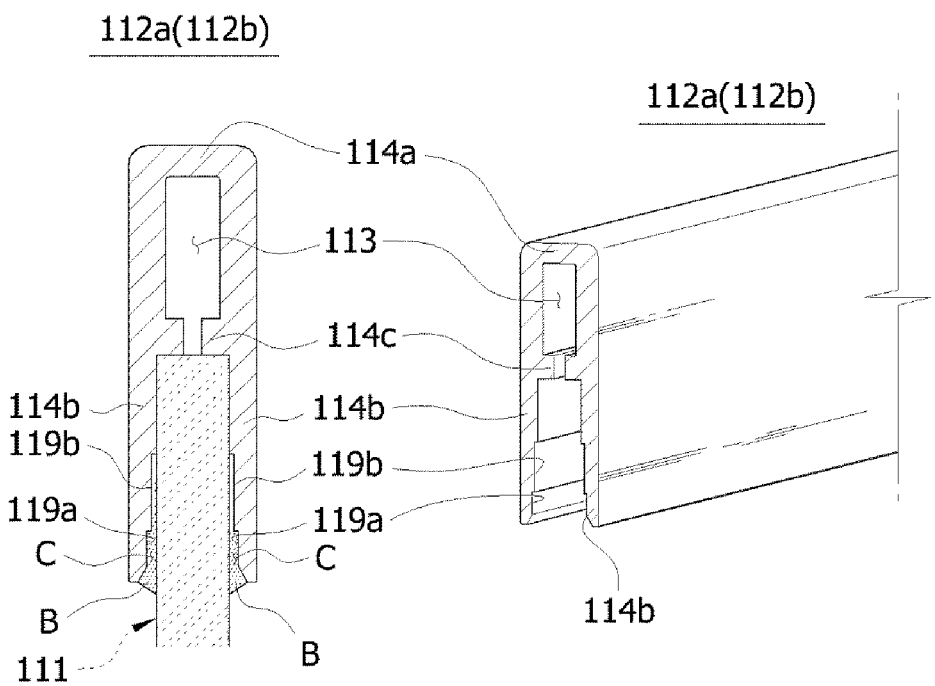

That is, as shown in FIGS. 5B to 5D, through the accommodation space forming part, an accommodation space C configured to accommodate the adhesive member B may be provided on the side of the support frame 112 so that a sufficient amount of the adhesive member B may be interposed between the support frame 112 and the filter member 111.

Thus, in the filter unit 110, the coupling force may be increased, and the airtightness may be enhanced by widening an adhesion area between the filter member 111 and the support frame 112 through a larger amount of the adhesive member B being accommodated in the accommodation space C.

Accordingly, the support frame 112 coupled to the edge side of the filter member 111 may be prevented from being detached or separated from the filter member 111 even when a fluid such as high-pressure washing water is supplied from the outside toward the filter member 111 during the backwashing process to remove the foreign substances existing on the filter member 111.

In addition, since the fluid such as higher-pressure washing water is allowed to be supplied through the improved coupling force between the filter member 111 and the support frame 112 during the backwashing process, the foreign substances attached to the filter member 111 may be removed more quickly and completely, and thus deterioration of the filtration efficiency may be prevented and the production yield may be improved.

For example, the accommodation space C for accommodating the adhesive member B may be formed by protrusions 118a and 118b respectively protruding from inner surfaces of the frames 112a and 112b constituting the support frame 112 along a lengthwise direction.

In more detail, as shown in FIG. 5B, the protrusions 118a and 118b may be formed to be positioned between ends of the second plates 114b constituting the frames 112a and 112b and the constraining members 114c and may protrude from the inner surfaces of the second plates 114b inwardly along the lengthwise direction of the frames 112a and 112b.

Accordingly, when the edge side of the filter member 111 is inserted between the pair of second plates 114b facing each other, one surface of the filter member 111 may be brought into line-contact with the end of the projection 118b, and thus a free space corresponding to a height of the protrusion 118b may be formed on the inner surface of the second plate 114b, thereby forming the accommodation space C capable of accommodating the adhesive member B.

Here, the protrusion 118b formed to protrude along the lengthwise direction of the frames 112a and 112b is brought into line-contact with one surface of the filter member 111 to perform the role of supporting the filter member 111 and simultaneously the role of preventing the adhesive member B supplied from the outside from moving toward the flow path 113.

Here, the positions where the protrusions 118a and 118b are formed may be appropriately changed as long as the protrusions 118a and 118b can be positioned between the constraining members 114c and the ends of the second plates 114b, and the amount of the adhesive member B accommodated in the accommodation space C may be increased as the protrusions 118a and 118b are relatively closer to the constraining members 114c than the ends of the second plates 114b and thus the adhesion may be further increased.

Meanwhile, a plurality of protrusions 118a and 118b may be provided on the inner surfaces of the second plates 114b and the plurality of protrusions 118a and 118b may be disposed to be spaced apart from each other along a height direction of the second plate 114b.

Here, the plurality of protrusions 118a and 118b may be formed to have different heights and may have a greater protrusion height from the end of the second plate 114b to the constraining member 114c side.

Accordingly, the protrusion 118b formed at a position closest to the constraining member 114c among the plurality of protrusions 118a and 118b may be formed to have the greatest protruding height so that when the filter member 111 is inserted, the protrusion 118b is brought into contact with one surface of the filter member 111, and the remaining protrusion 118a is buried by the adhesive member B accommodated in the accommodation space C without being brought into contact with one surface of the filter member 111.

Therefore, the remaining protrusion 118a may be integrated with the adhesive member B to more effectively prevent the frames 112a and 112b from being separated from the edges of the filter members 111.

As another example, the accommodation space C for accommodating the adhesive member B may be formed by step surfaces 119, 119a, and 119b formed on the inner surfaces of the frames 112a and 112b constituting the support frame 112 by being cut along the lengthwise direction.

That is, as shown in FIG. 5C, in the frames 112a and 112b, the step surface 119 may be formed on an inner surface of the end side of the second plate 114b constituting the frames 112a and 112b and may be formed along the lengthwise direction of the frames 112a and 112b.

Accordingly, when the edge side of the filter member 111 is inserted between the pair of second plates 114b facing each other, one surface of the filter member 111 may be brought into surface-contact with the remaining surface of the second plate 114b excluding the step surface 119 and a free space corresponding to a depth of the step surface 119 may be formed on the inner surface of the second plate 114b, thereby forming the accommodation space C capable of accommodating the adhesive member B.

Here, as shown in FIG. 5D, in the frames 112a and 112b, the plurality of step surfaces may be formed on the inner surface of the second plate 114b, and the plurality of step surfaces 119a and 119b may be formed in a multistage manner having different heights and being connected to each other and may be formed to have a smaller depth from the end of the second plate 114b toward the constraining member 114c.

Accordingly, the step surface 119b formed at a position closest to the constraining member 114c among the plurality of step surfaces 119a and 119b may be formed to have the smallest depth, and the step surface 119a formed at a position closest to the end side of the second plate 114b may be formed to have the greatest depth. As a result, the adhesive member B may be smoothly introduced into the accommodation space C when the adhesive member B is inserted into the accommodation space C.

Meanwhile, in a case in which the plurality of filter units 110 are fastened to the block frame 120 or 220 to be arranged parallel to each other, each of the filter units 110 may include a gap adjuster 116 to form the gap d between the adjacent filter members 111.

The gap adjuster 116 may be provided on at least one of the plurality of frames 112a and 112b constituting the support frame 112 but may be provided on at least one of the coupling members 114 and 114'.

For example, the gap adjuster 116 may be formed on one side of the coupling members 114 and 114' and may include an extending plate 116a and a separation portion 116c.

Figure 6:
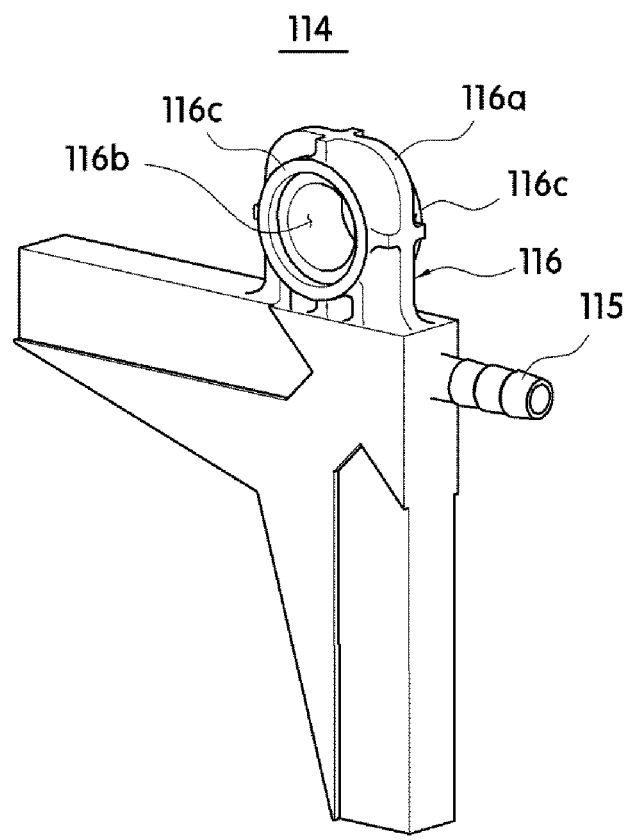
FIG. 6 is a view illustrating a coupling member applicable to the filter unit according to the present invention.

In more detail, as shown in FIG. 6, the extending plate 116a may extend outward from a body of the coupling members 114 and 114', and the separation portion 116c may protrude from one surface of the extending plate 116a by a certain height so as to have a certain thickness.

Here, the separation portion 116c may be formed on both surfaces of the extending plate 116a or on only one surface of the extending plate 116a, or may be formed in a multistage structure having different heights from one surface of the extending plate 116a.

Further, it should be noted that the protruding height of the separation portion 116c may be formed such that the gap between the plurality of filter members 111 arranged in parallel to each other has 3 mm or more, but the present invention is not limited thereto, and the protruding height of the separation portion 116c may be appropriately changed according to design conditions.

Thus, when the plurality of plate-type filter units 110 are fastened to the fastening bar 123 side of the block frame 120 or 220, the gap may be formed between the pair of filter members 111 disposed to be adjacent to each other through the separation portion 116c even when the plate-type filter units 110 are completely brought into close contact with each other.

Accordingly, in the case in which the plurality of filter units 110 are fastened to the block frame 120 or 220, when the filter units 110 fastened to the fastening bar 123 are brought into close contact with each other, the gap may be uniformly formed between the adjacent filter members 111 by the separation portion 116c even when the worker does not individually adjust the gap between the filter units, and the gap between the adjacent pair of filter members 111 may be maintained when the front frame 121 and the rear frame 122 are coupled to both sides of the fastening bar 123.

Therefore, the plurality of filter units 110 may maintain the state in which both sides of each filter member 111 are in contact with the liquid to be filtered and thus simultaneously produce the filtered water using the suction force provided from the outside.

In addition, when the backwashing operation is performed to remove the foreign substances attached to the filter member 111 after the operation of producing the filtered water is repeatedly performed, the foreign substances attached to the surface of the filter member 111 may be separated by the pressure of the fluid such as the washing water supplied from the outside, and then fall into the space between the adjacent filter members 111

Meanwhile, the fastening hole 116b configured to couple the filter unit 110 to the block frame 120 or 220 may be formed on the gap adjuster 116 side and may be formed to pass through the extending plate 116a.

Accordingly, the gap adjuster 116 may perform the role of maintaining the gap between the adjacent filter members 111 and simultaneously the role of a coupling hole for fastening each filter unit 110 to the block frame 120 or 220.

In this case, the separation portion 116c may be provided so as to entirely or partially surround a rim of the fastening hole 116b.

Although it is shown in the drawing that the fastening hole 116b is formed to pass through the extending plate 116a in a circular shape, the present invention is not limited thereto and may have a shape corresponding to a shape of a cross section of the fastening bar 123. For example, the fastening hole 116b may be formed in the shape of a circle, an arc, a polygonal cross-section, or a combination thereof.

In addition, the fastening hole 116b may have a shape in which one side thereof is open (see FIG. 9) so that the filter unit 110 is inserted into the block frame 120 or 220 from one side portion of the block frame 120 or 220 and hooked to the fastening bar 123.

In this case, the plurality of fastening bars 123 interconnecting the front frame 121 and the rear frame 122 may be disposed to have different heights.

Figure 9:
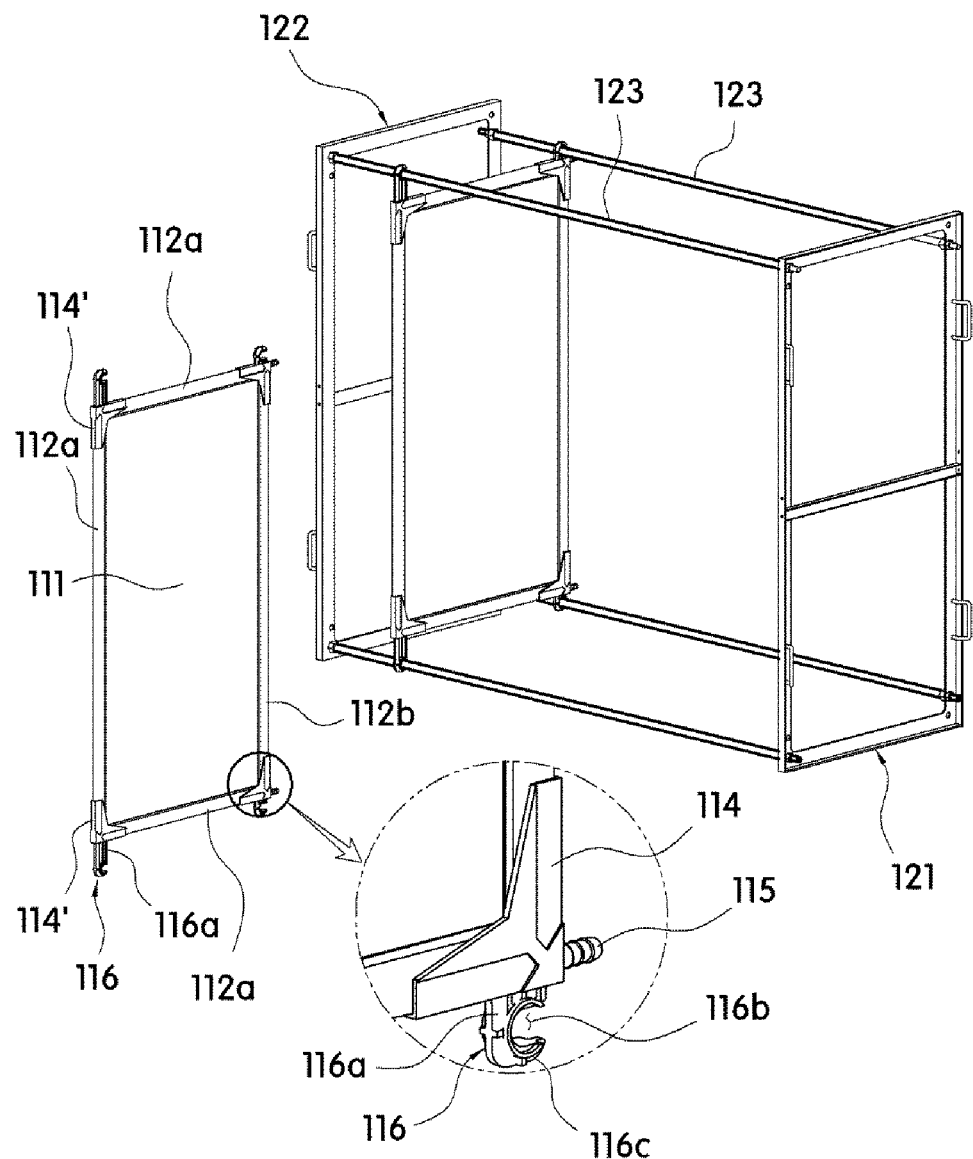
FIG. 9 is a view illustrating another form of coupling the filter unit to a block frame in the water treatment plate-type filter module according to the present invention.

For example, referring to FIG. 9, among the plurality of fastening bars 123, a fastening bar to be disposed on an upper left side may be disposed at a relatively higher position than a fastening bar to be disposed on an upper right side, and a fastening bar to be disposed on a lower left side may be disposed at a relatively lower position than a fastening bar to be disposed on a lower right side. Similarly, the four fastening holes 116b formed in the filter unit 110 may be formed to be located at the same positions as the four fastening bars described above, and the positions of the fastening holes 116b may be adjusted by forming protruding lengths of the extending plate 116a on which the fastening holes 116b are formed differently from each other.

Thus, when the filter unit 110 is inserted into an inside of the block frame 120 or 220 through a left side portion of the block frame 120 or 220, the filter unit 110 may be smoothly moved without interfering with the fastening bars 123 located at the upper left side and the lower left side and fastened to the corresponding fastening bar 123 through the fastening holes 116b having one side open.

Meanwhile, the receiving port 115 may be formed in the support frame 112 so as to communicate with the flow path 113 formed in the support frame 112 but may be formed on the coupling member side coupled to an edge side of the support frame 112 and at least one of the plurality of coupling members 114 and 114'.

Accordingly, among the plurality of coupling members 114 and 114' coupled to the edges of the support frame 112, the coupling member 114' on which the receiving port 115 is not formed may only serve to connect a pair of adjacent frames, while the coupling member 114 on which the receiving port 115 is formed may serve to connect the pair of adjacent frames and also serve as a discharge port configured to discharge the filtered water produced through the receiving port 115 to the outside.

Here, although one receiving port 115 may be provided, the receiving port 115 may be provided in each of the two coupling members 114 to provide a uniform suction pressure toward the filter member 111.

Further, the receiving port 115 may be formed integrally with the coupling member 114, or may be provided as a separate member and coupled to the coupling member 114.

Here, when the coupling member 114 is coupled to two adjacent frames 112a and 112b, a communication space 117 communicating with the flow paths 113 each formed in the two frames 112a and 112b may be formed in the coupling member 114, and the receiving port 115 may communicate with the communication space 117.

Figure 7A:
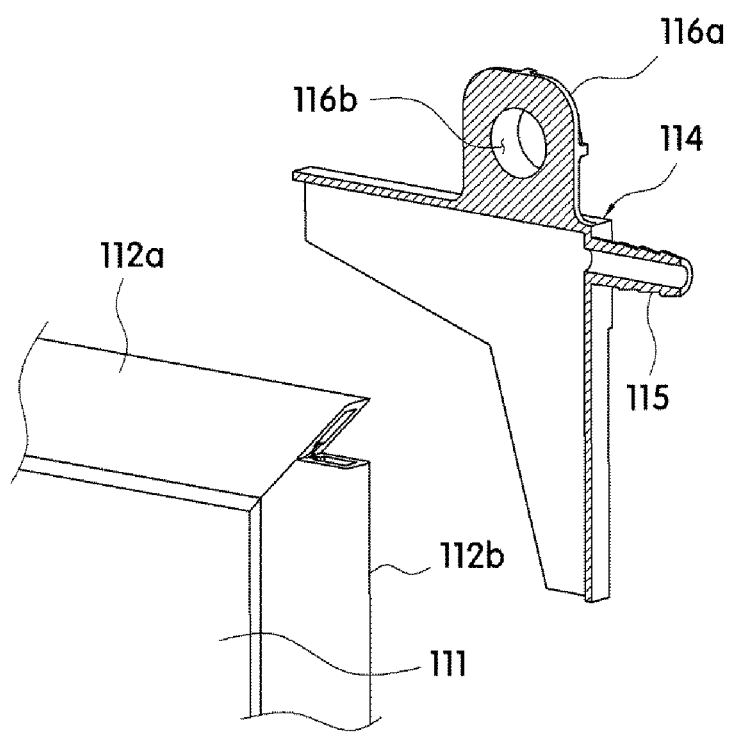
Figure 7B:
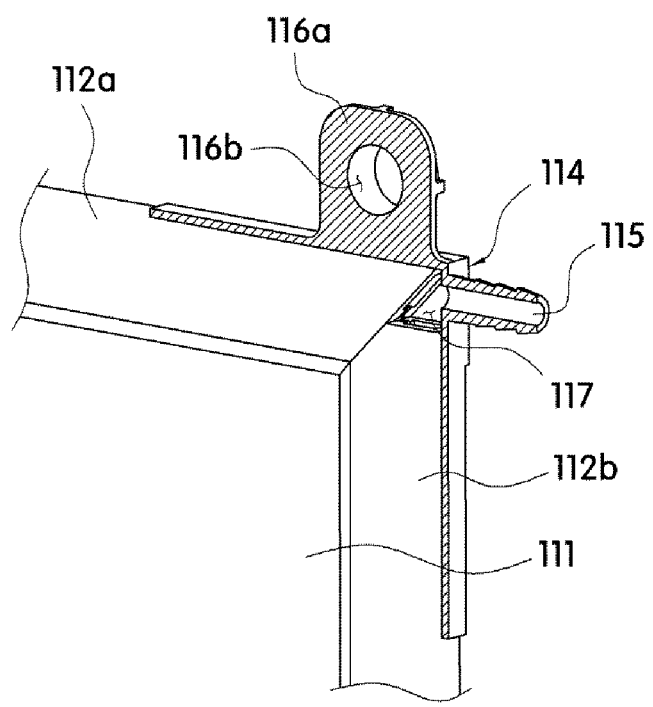
Figure 8:
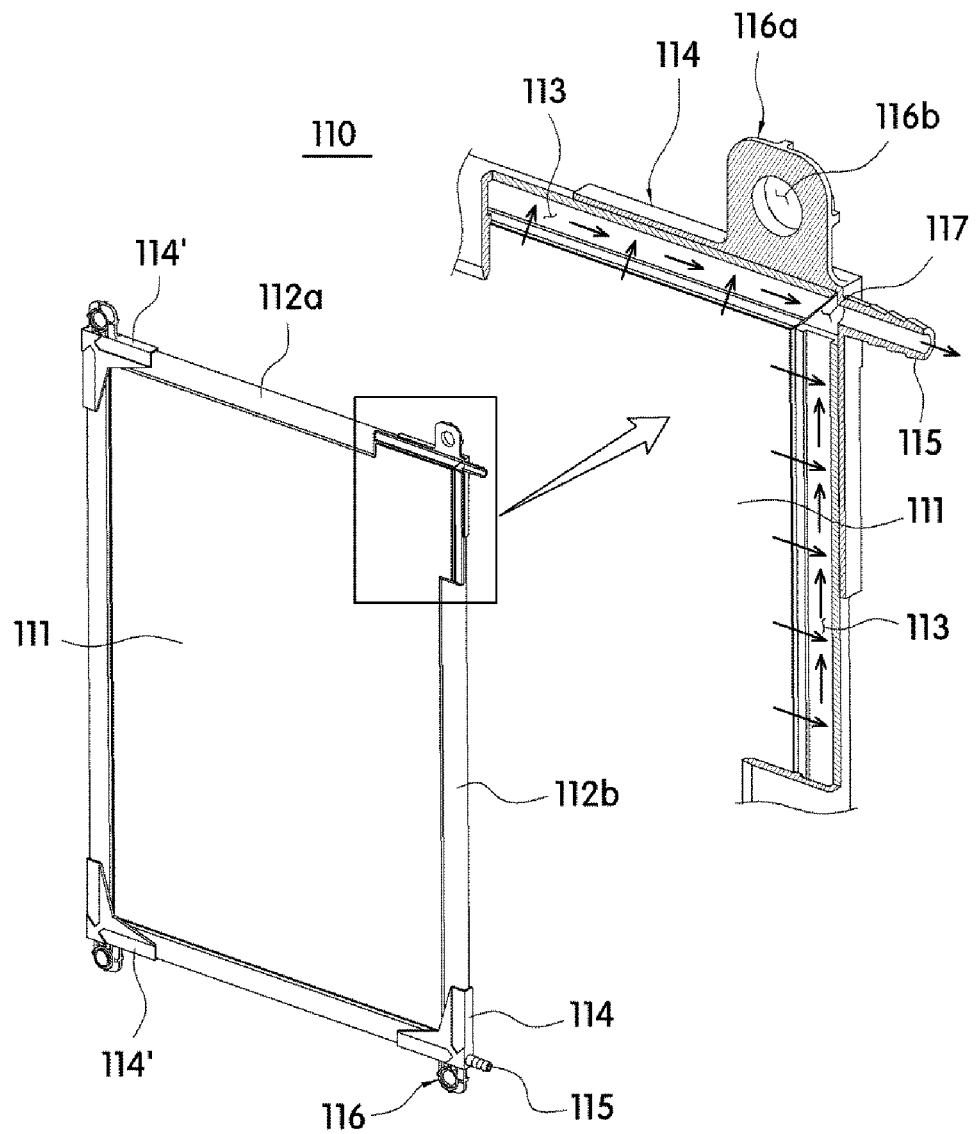
FIG. 8 is a view illustrating a movement path of filtered water introduced into a receiving port in the filter unit according to the present invention.

For example, as shown in FIGS. 7A, 7B and 8, when the coupling member 114 on which the receiving port 115 is formed is coupled to the two frames 112a and 112b, the communication space 117 may be formed on the end sides of the two frames 112a and 112b inserted into the coupling member 114. In this case, the communication space 117 may be a space formed by the end portions of the two frames, which are facing each other and not matched with each other, as an end of one 112b of the two frames inserted into the coupling member 114 is cut.

Accordingly, as shown in FIG. 8, the filtered water moving along the flow path 113 formed in one frame 112a of the two frames 112a and 112b coupled to the coupling member 114 and the filtered water moving along the flow path 113 formed in the other frame 112b may meet with each other in the communication space 117 and may be discharged to the outside through the receiving port 115 communicating with the communication space 117.

Therefore, the filtered water, in which the foreign substances are filtered out by the suction force provided from the pump (not shown) while moving into the filter member 111, may be introduced into the flow paths 113 formed in the plurality of frames 112a and 112b, and moved toward the communication space 117 along the flow paths 113 and then discharged to the outside through the receiving port 115.

On the contrary, in the backwashing process, the fluid such as washing water supplied from the outside may be introduced through the receiving port 115 and supplied toward each flow path 113 formed in the plurality of frames 112a and 112b after passing through the communication space 117.

Figure 13:
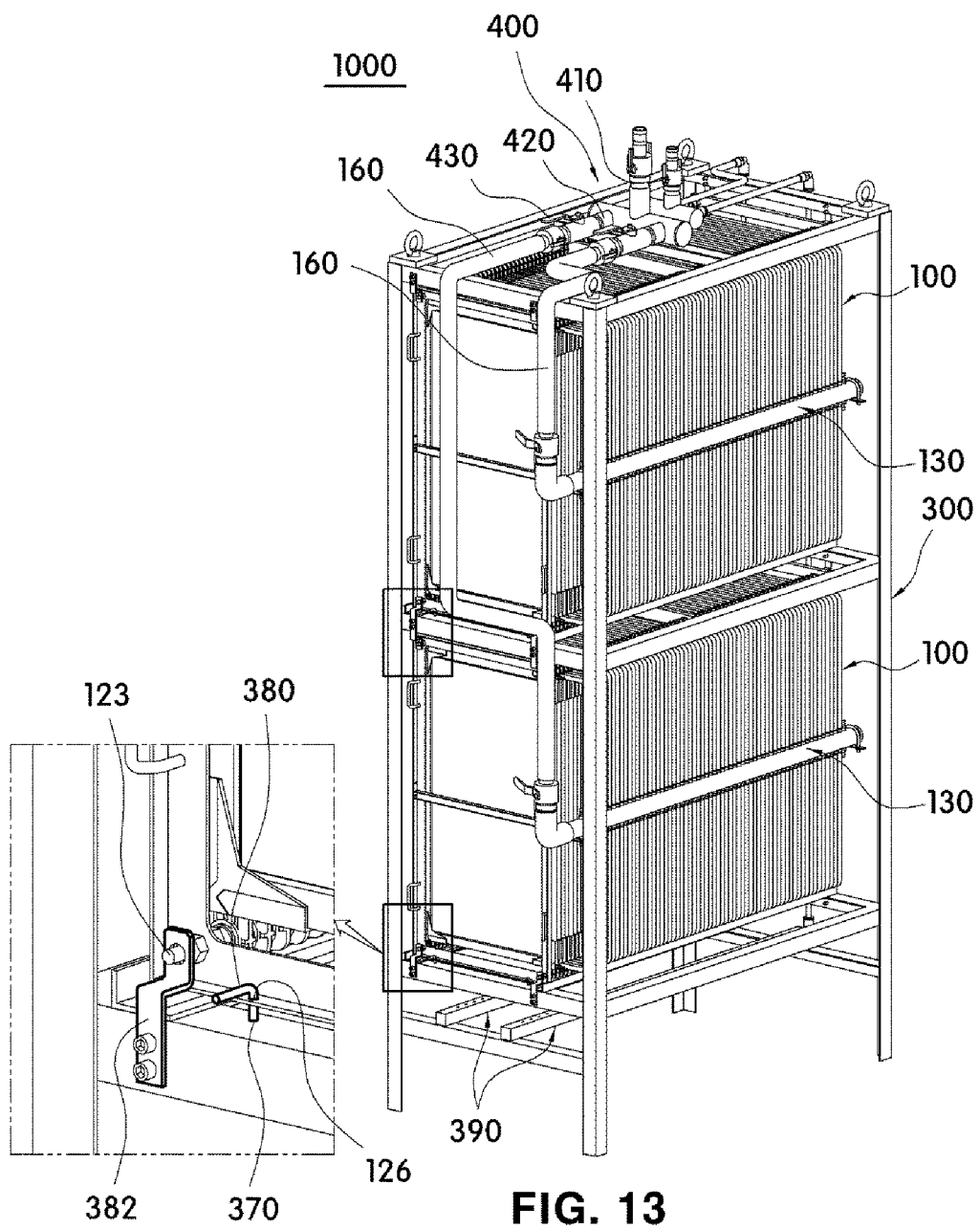
FIG. 13 is a view illustrating a water treatment filter assembly according to one embodiment of the present invention.
Figure 14:
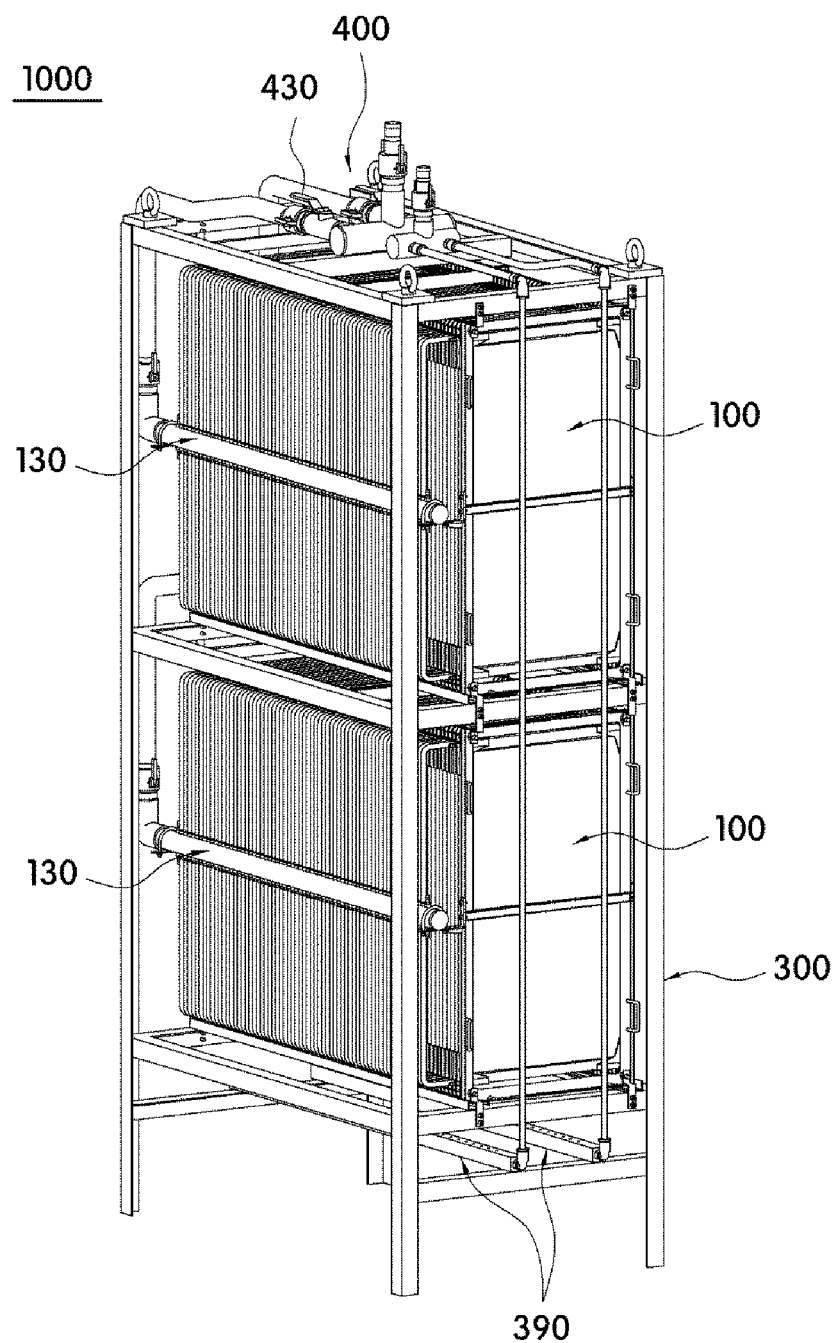
FIG. 14 is a view of FIG. 13 viewed from another angle.
Figure 17:
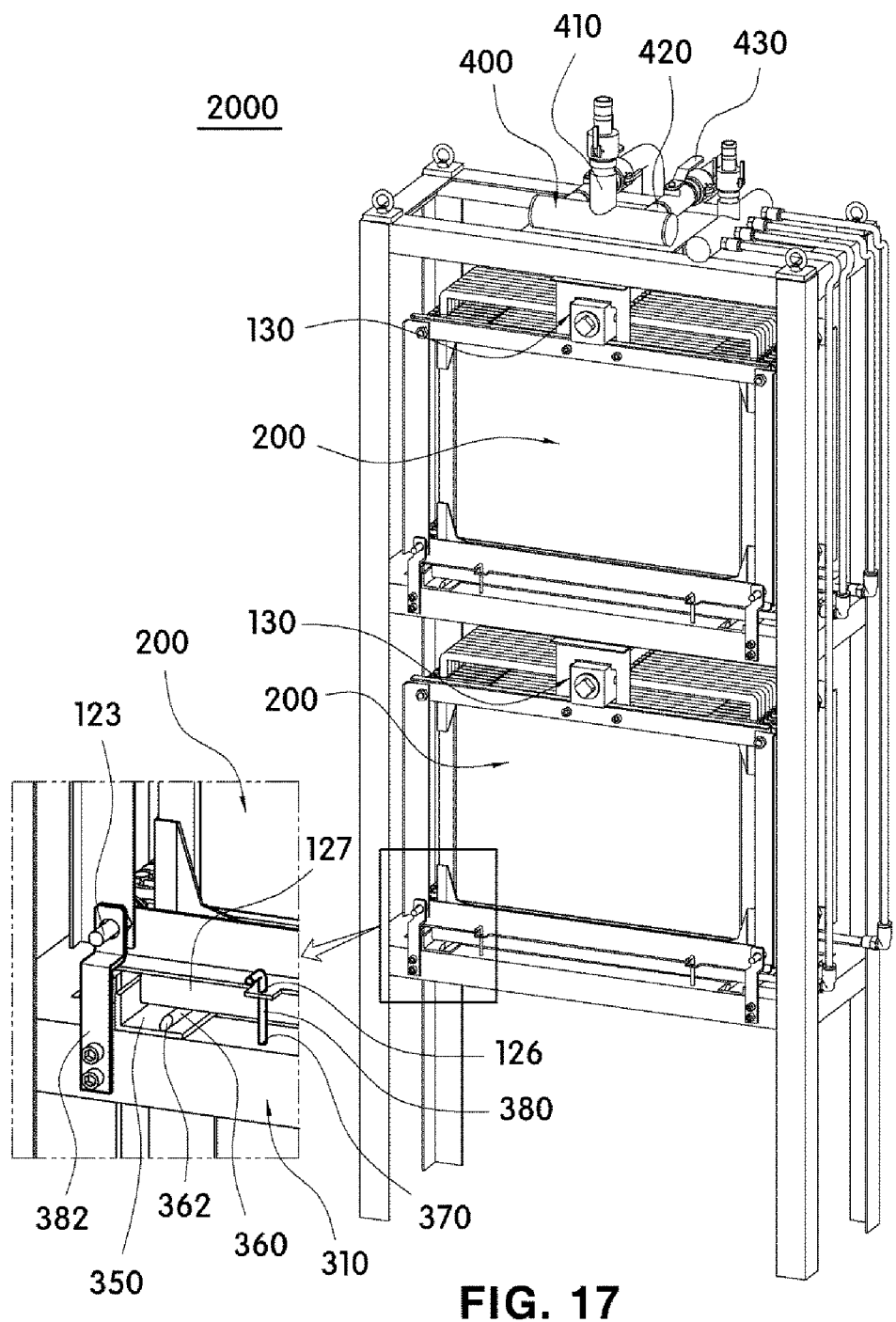
FIG. 17 is a view illustrating a water treatment filter assembly according to another embodiment of the present invention.
Figure 18:
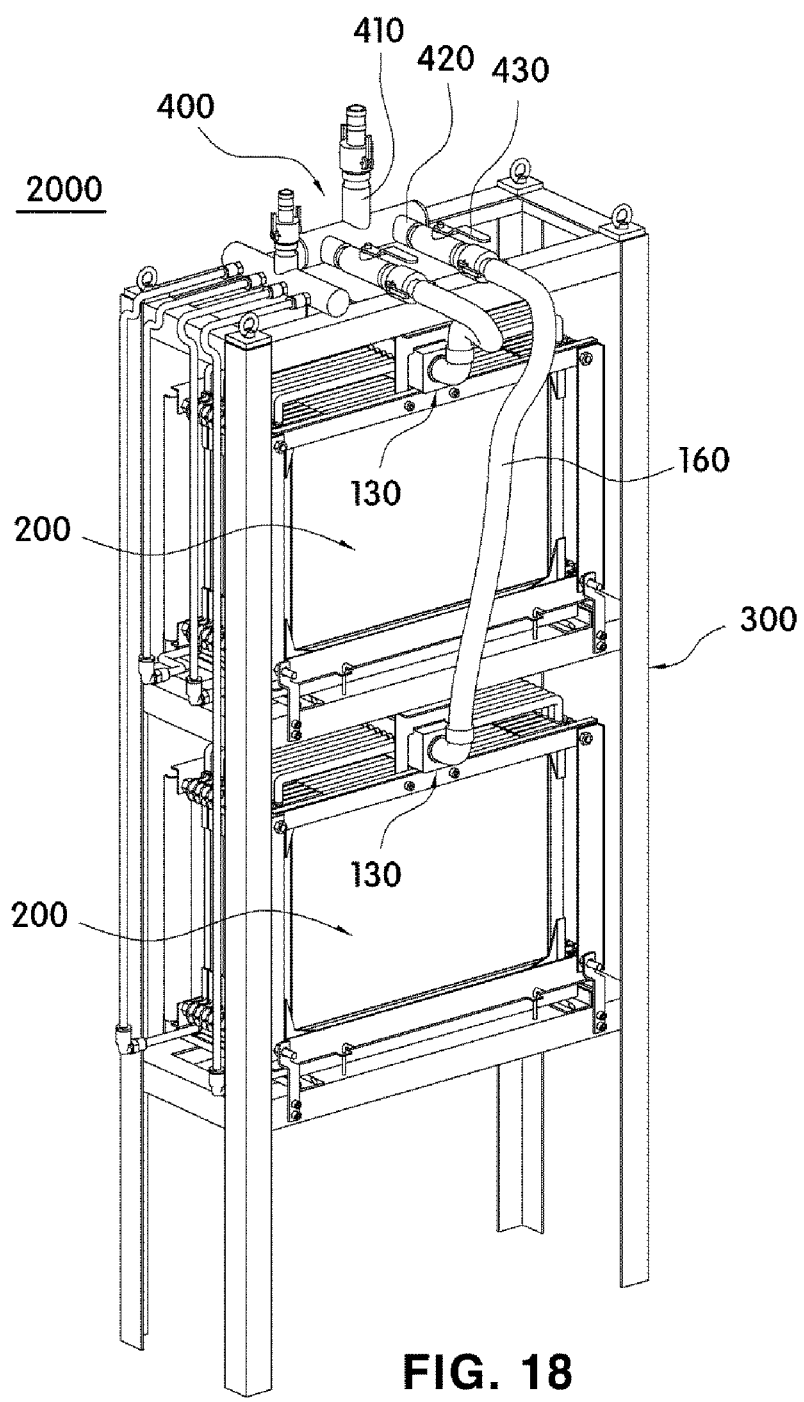
FIG. 18 is a view of FIG. 17 viewed from another angle.

Meanwhile, as shown in FIGS. 13 and 17, the water treatment plate-type filter module 100 or 200 described above may be implemented as a water treatment filter assembly 1000 or 2000 applicable to the water treatment system.

The water treatment filter assembly 1000 or 2000 may include at least one water treatment plate-type filter module 100 or 200 described above and a fixing frame 300 configured to fix the water treatment plate-type filter module 100 or 200.

Further, as described above, the water treatment plate-type filter module 100 or 200 may be configured in the form of one unit-module through the block frame 120 or 220, which may be detachably coupled to the fixing frame 300, through the block frame 120 or 220.

Thus, when the water treatment filter assembly 1000 or 2000 according to the present invention is provided with the plurality of water treatment plate-type filter module 100 or 200, other operations such as replacement, separation, shutdown, and backwashing operations of any one water treatment plate-type filter module 100 or 200 may be selectively or individually performed without stopping the entire process.

To this end, the fixing frame 300 may be configured in a frame structure having a mounting space S whose front surface is open like the block frame 120 or 220 described above so that the fluid may be smoothly introduced into the water treatment plate-type filter module 100 or 200.

Further, the fixing frame 300 may be configured to accommodate one water treatment plate-type filter module 100 or 200 but may be configured to have a plurality of mounting spaces S to simultaneously accommodate the plurality of water treatment plate-type filter modules 100 or 200.

Figure 16:
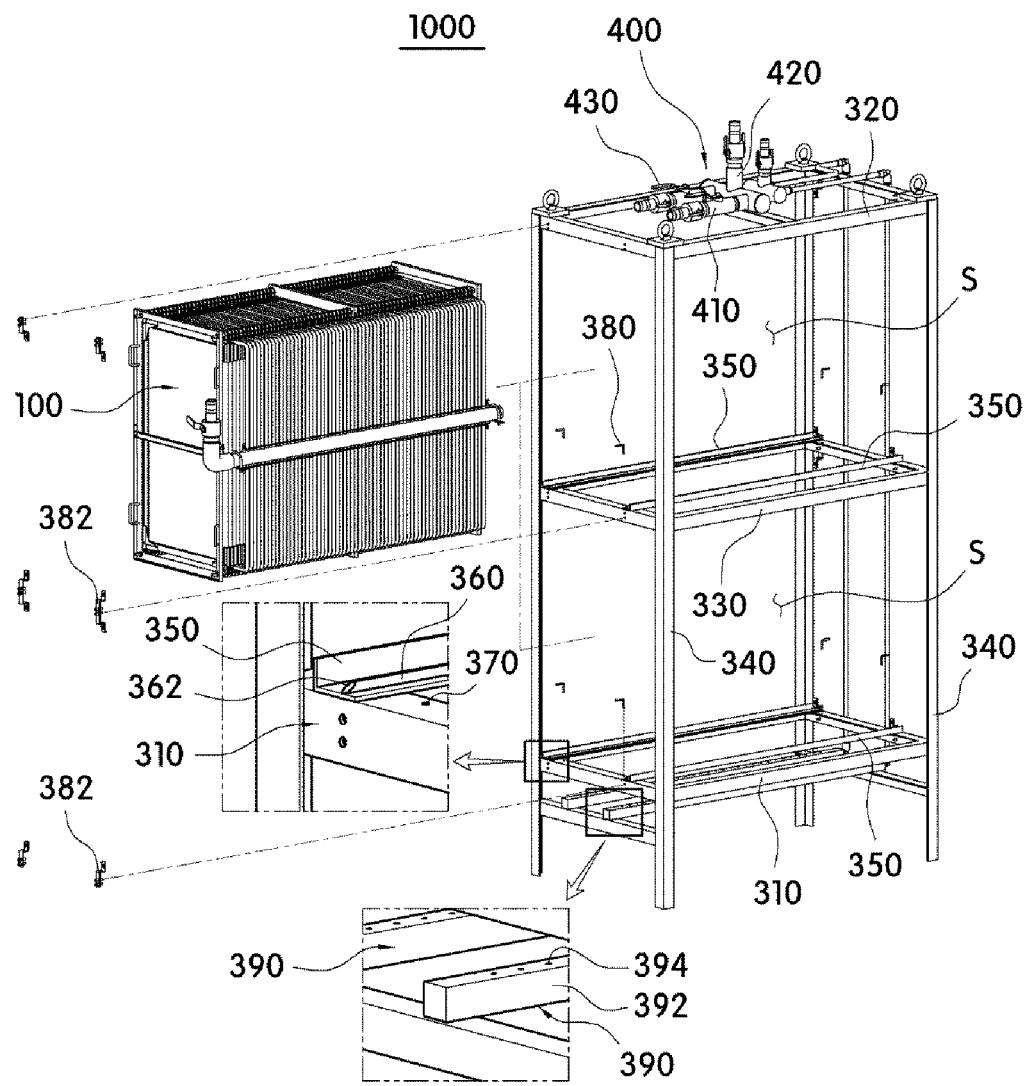
FIG. 16 is a view illustrating a state in which the water treatment plate-type filter module is separated from a fixing frame in FIG. 13.
Figure 19:
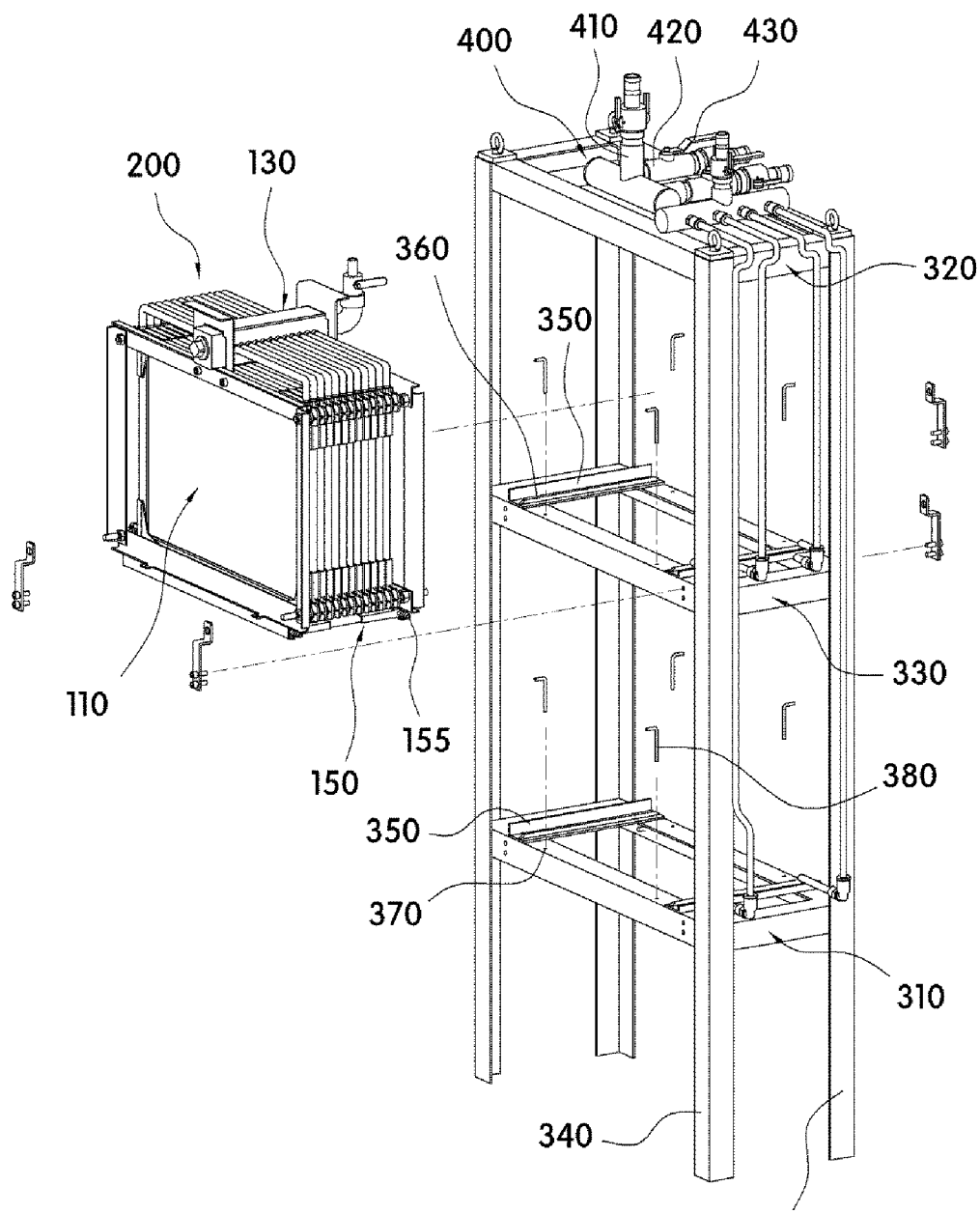
FIG. 19 is a view illustrating a state in which the water treatment plate-type filter module is separated from a fixing frame in FIG. 17.

For example, as shown in FIGS. 16 and 19, the fixing frame 300 may have a configuration in which a first frame part 310 and a second frame part 320, which have an approximately rectangular shape, are interconnected through a plurality of column frames 340, and a configuration in which the plurality of mounting spaces S are formed by at least one third frame part 330 disposed between the first frame part 310 and the second frame part 320.

However, it should be noted that the fixing frame 300 is not limited thereto, and the plurality of mounting spaces S may be formed by being partitioned by the column frames 340 connecting the first frame part 310 to the second frame part 320 or by the third frame part 330 and the column frames 340.

Here, as described above, the water treatment plate-type filter module 100 or 200 may be detachably coupled to the fixing frame 300 and may be detachably coupled to the fixing frame 300 in a sliding manner.

To this end, the fixing frame 300 may include at least two guide rails 350 configured to guide the sliding movement thereof by supporting an edge side of the water treatment plate-type filter module 100 or 200 inserted into the mounting space S and, more specifically, an edge side of the block frame 120 or 220.

For example, as shown in FIGS. 16 and 19, the two guide rails 350 may be formed on upper surfaces of the second frame part 320 and the third frame part 330 corresponding to the bottom of the mounting space S.

Accordingly, in a case in which the water treatment plate-type filter module 100 or 200 is to be coupled to the fixing frame 300, a lower edge side of the water treatment plate-type filter module 100 or 200 is brought into contact with the two guide rails 350 and pushed to an inside of the mounting space S by applying an external force, thereby coupling the water treatment plate-type filter module 100 or 200 to the fixing frame 300.

Here, a bar-shaped guide bar 360 having a certain length may be provided on the side of the guide rail 350. Thus, the guide bar 360 may be brought into direct contact with the lower edge side of the water treatment plate-type filter module 100 or 200 when the water treatment plate-type filter module 100 or 200 is being slidably moved. Accordingly, the contact area between them is reduced so as to decrease a frictional force so that the sliding movement of the water treatment plate-type filter module 100 or 200 may be smoothly performed.

Further, an inclined surface 362 formed to be inclined upward from an end of the guide bar 360 may be formed at a front end of the guide bar 360. Thus, when the water treatment plate-type filter module 100 or 200 is coupled to the fixing frame 300, a sliding entering of the water treatment plate-type filter module 100 or 200 may be easily performed.

Meanwhile, the water treatment plate-type filter module 100 or 200 inserted into and disposed on the side of the mounting space S may be fixed to the fixing frame 300 by restricting the sliding movement through a fastening member 380.

Figure 15:
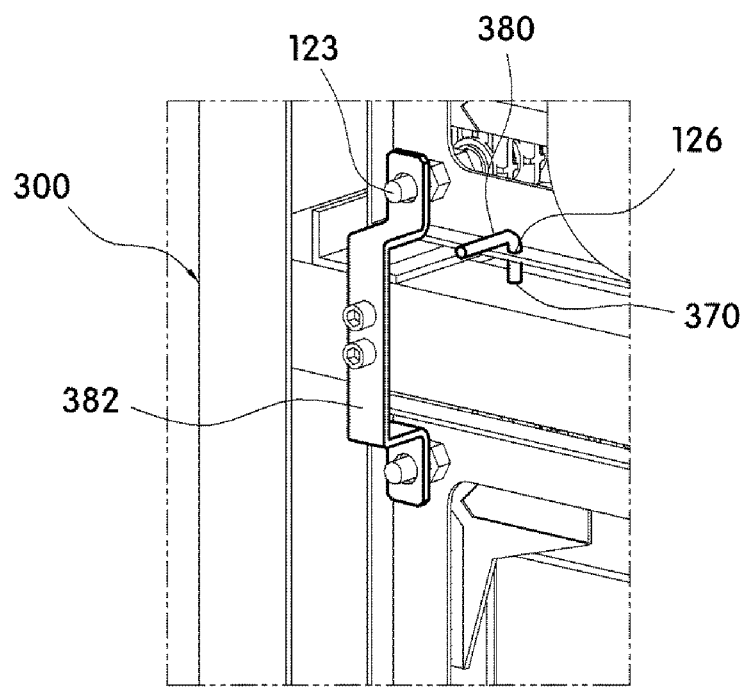
FIG. 15 is an enlarged view illustrating portion "A" in FIG. 13.

To this end, a first through hole 126 and a second through hole 370 may be formed on the sides of the block frame 120 or 220 and the fixing frame 300, in the regions corresponding to each other, to allow the fastening member 380 to pass therethrough simultaneously (see FIGS. 15 and 17).

Accordingly, when the fastening member 380 is inserted to pass simultaneously through the first and second through holes 126 and 370 in a state in which the water treatment plate-type filter module 100 or 200 is disposed in the mounting space S, the sliding movement of the water treatment plate-type filter module 100 or 200 may be restrained.

Further, in a case in which the water treatment plate-type filter module 100 or 200 is to be separated from the fixing frame 300, the water treatment plate-type filter module 100 or 200 may be slidably moved when the fastening member 380 inserted to pass simultaneously through the first and second through holes 126 and 370 is separated, thereby easily separating the water treatment plate-type filter module 100 or 200.

Meanwhile, the water treatment filter assembly 1000 or 2000 according to the present invention may include a main collecting tube 400 configured to collect the filtered water produced in each water treatment plate-type filter module 100 or 200 into one when the plurality of water treatment plate-type filter modules 100 or 200 are provided.

The main collecting tube 400 may be connected to the receiving and collecting tube 130 provided in each water treatment plate-type filter module 100 or 200 through a connecting tube 160 in a one-to-one manner.

For example, the main collecting tube 400 may be in the form of a hollow tube having a certain length and may include a plurality of third fittings 410 connected to the receiving and collecting tube 130 provided in each filter module 100 or 200 through the connecting tube 160 and at least one fourth fitting 420 configured to discharge the filtered water introduced through the plurality of third fittings 410 to the outside or to supply the suction force provided from the outside toward the plurality of third fittings 410.

Thus, in the water treatment filter assembly 1000 or 2000 according to the present invention, the suction force provided from the outside may be introduced into the hollow tube through the fourth fitting 420 of the main collecting tube 400 and then transferred toward each filter module 100 or 200 through the plurality of third fittings 410, and the filtered water produced in each filter module 100 or 200 may be moved and collected in the hollow tube through the third fittings 410 and then discharged to the outside through the fourth fitting 420.

Here, the main collecting tube 400 may be fixed to one side of the fixing frame 300, and an opening and closing valve 430 configured to allow or block an introduction of the fluid may be provided on at least one of the third fitting 410 and the fourth fitting 420.

Accordingly, the water treatment filter assembly 1000 or 2000 according to the present invention may also be configured as one unit-module like the above-described water treatment plate-type filter module 100 or 200, and when the plurality of water treatment filter assemblies 1000 or 2000 according to the present invention are applied to one water treatment system, the water treatment system may be completed by interconnecting the water treatment filter assemblies 1000 or 2000, which are implemented in the form of a unit module, thereby reducing an installation time and easily installing a large scale water treatment system.

In addition, in a case in which it is necessary to selectively stop production of the filtered water from one of the pluralities of water treatment filter assemblies, it is possible to selectively stop the production of the filtered water of the corresponding water treatment filter assembly among the plurality of water treatment filter assemblies without stopping the operation of the entire system.

Meanwhile, the water treatment filter assembly 1000 or 2000 according to the present invention may further include air diffusers 150 and 390 configured to blow bubbles toward the water treatment plate-type filter module 100 or 200.

As shown in FIGS. 13 and 19, the generated bubbles may be supplied toward the filter units 110 and may be introduced into a space formed between the adjacent filter members 111 by disposing the air diffusers 150 and 390 on a lower portion of the plurality of filter units 110 fastened to the fixing frame 300.

Accordingly, in the water treatment plate-type filter module 100 or 200, fouling deposited on a surface of the filter member 111 formed in a plate type may be removed or the amount of the fouling that is deposited on the surface of the filter member 111 may be reduced while the bubbles of a certain size generated through the air diffusers 150 and 390 are rising.

Thus, in the water treatment filter assembly 1000 or 2000 according to the present invention, the cleaning of the surface may be performed through the bubbles provided in the air diffusers 150 and 390, thereby increasing a cleaning period and a replacement period of the filter unit 110.

Here, the air diffusers 150 and 390 may be provided in the form of a hollow tube having a certain length or in the form of a flat plate.

Further, the air diffuser may be fixed to the fixing frame 300 configured to mount the water treatment plate-type filter module 100 or 200 or may be included in the water treatment plate-type filter module 200.

For example, as shown in FIG. 16, the air diffuser 390 may be a hollow tube 392 in which a plurality of ejection holes 394 having a certain size are formed and may be fixed to the fixing frame 300 so as to be positioned on a lower portion of the water treatment plate-type filter module 100, and a plurality of air diffusers 390 may be arranged with a certain gap.

As another example, as shown in FIGS. 13 and 17, the air diffuser 150 may be formed in a plate type and disposed on a lower portion of the water treatment plate-type filter module 200, and coupled to the block frame 120 or 220 constituting the water treatment plate-type filter module 200. That is, in a case in which the air diffuser 150 is formed in the plate type, the water treatment plate-type filter module 200 may be provided in the form of a unit module including the air diffuser 150.

Accordingly, the plurality of water treatment plate-type filter modules 200 installed in the mounting space S of the fixing frame 300 may be provided with an individual air diffuser 150. In this case, as shown in FIG. 11, the air diffuser 150 may be detachably coupled by being inserted into the two rail portions 127 whose both edge sides are connected to the block frame 120 or 220.

As a result, although the water treatment filter assembly 2000 is configured in a multistage form including the plurality of water treatment plate-type filter modules 200, the individual air diffuser 150 may be provided in all water treatment plate-type filter modules 200 installed in the mounting space S, and thus all water treatment plate-type filter modules 200 may equally obtain the cleaning effect by the bubbles generated in the air diffuser 150. Further, the plurality of water treatment plate-type filter modules 200 may have a similar replacement period, and thus the maintenance work may be simplified.

Meanwhile, although all plate type air diffusers 150 are applicable as long as they are configured in the form of a plate shape having a certain area and are capable of generating bubbles, the air diffuser 150 may have the same structure as that of the above-described filter unit 110.

Figure 12:
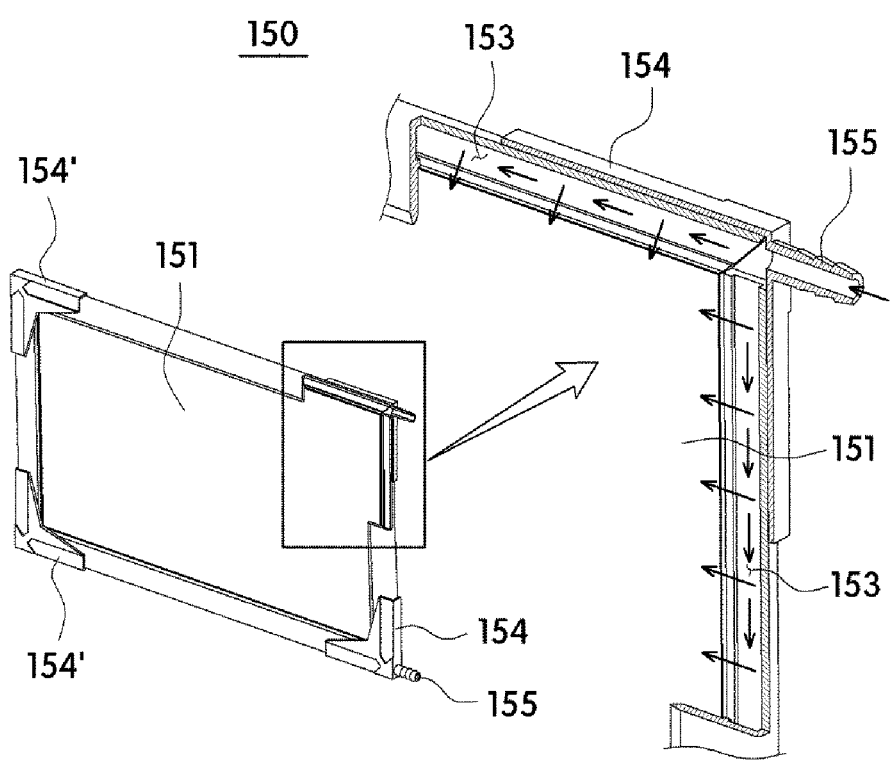
FIG. 12 is a partial cutaway view illustrating a detailed configuration of an air diffuser applicable to FIG. 9.

That is, as shown in FIG. 12, the plate type air diffuser 150 may have a form including a bubble generating member 151 in the form of a plate, an edge frame 152 formed with a flow path 153, connecting members 154 and 154', and an inlet 155 like the above-described filter unit 110 including the filter member 111, the support frame 112 formed with the flow path 113, the coupling members 114 and 114', and the receiving port 115. In this case, the bubble generating member 151, the edge frame 152 formed with the flow path 153, the connecting members 154 and 154', and the inlet 155 may have the same structure as the above-described filter members 111 including the nanofiber web 111b, the support frame 112 formed with the flow path 113, the coupling members 114 and 114', and the receiving port 115, and air supplied from the outside may flow in the same manner as the fluid flows in the filter unit 110. However, the connecting members 154 and 154' may have a form in which the gap adjuster 116 included in the coupling members 114 and 114' is omitted.

Accordingly, the air supplied from the outside toward the air diffuser 150 may be generated as fine bubbles while passing through pores formed in the bubble generating member 151, and since the bubbles may be uniformly generated on the entire surface of the bubble generating member 151, a large amount of fine bubbles in a dispersed form may be generated. Therefore, the fine bubbles generated in the bubble generating member 151 may be uniformly brought into contact with the entire surface of the filter member 111 so that the cleaning effect of the filter member 111 may be increased.

Meanwhile, although not shown in the drawings, in a case in which the air diffuser 390 is provided in the form of a hollow tube having the plurality of ejection holes 394, a nanofiber web having micropores may be attached to the hollow tube so as to cover the plurality of ejection holes 394 so that the fine bubbles may be generated. Here, the nanofiber web may be the nanofiber web 111b applied to the above-described filter member 111.

In addition, in a case in which the air diffuser 390 is provided in the form of the hollow tube having the plurality of ejection holes 394, the air diffuser 390 may be detachably coupled to the block frame 120 or 220 like the plate type air diffuser 150.

The above-described water treatment plate-type filter module 100 or 200 and filter assembly 1000 or 2000 may be applied to a known wastewater treatment system.

Further, although it has been described that the filter unit 110 shown in FIGS. 3 to 8 is applied to the above-described water treatment plate-type filter module 100 or 200 and filter assembly 1000 or 2000, it should be noted that the present invention is not limited thereto, and the filter unit 110 shown in FIGS. 3 to 8 may be implemented as an individual filter unit and may be used as a single independent product.

The embodiments of the present invention have been described above. However, it should be noted that the spirit of the present invention is not limited to the embodiments in the specification and those skilled in the art and understanding the present invention may easily suggest other embodiments by addition, modification, and removal of the components within the same spirit, but those are construed as being included in the spirit of the present invention.

The invention claimed is:

1. A filter assembly for water treatment comprising:
a plurality of plate-type filter modules for water treatment;
a fixing frame to which the plurality of plate-type filter modules for water treatment is detachably coupled; and
a main collecting tube fixed to the fixing frame,
wherein each of the plurality of plate-type filter modules for water treatment comprises:
a plurality of filter units formed in a plate shape having a certain area;
a block frame to which the plurality of filter units are fastened so that a state of being arranged in parallel to each other is maintained,
a receiving and collecting tube fixed to one side of the block frame and including a plurality of first fittings connected to the plurality of filter units in a one-to-one manner to allow filtered water produced in each filter unit to be introduced therethrough and at least one second fitting configured to discharge the filtered water introduced through the plurality of first fittings to the main collection tube, and an opening and closing valve configured to open and close the at least one second fitting, and
a pair of filter units which are disposed on the outermost positions among the plurality of filter units and are not connected to the receiving and collecting tube,
wherein the fixing frame includes a plurality of mounting spaces configured to respectively accommodate the plurality of plate-type filter modules for water treatment, and in the plurality of filter modules respectively fastened to the plurality of mounting spaces, the receiving and collecting tubes are connected to the main collecting tube through a connecting tube in a one-to-one manner so that filtered water collected in the receiving and collecting tubes moves toward the main collecting tube.

2. The filter assembly of claim 1, wherein the block frame includes a front frame and a rear frame, which are formed of a frame structure, and a plurality of fastening bars connecting the front frame and the rear frame to each other.

3. The filter assembly of claim 2, wherein the block frame includes at least one horizontal checking frame connecting a pair of fastening bars facing each other, wherein the horizontal checking frame includes a horizontal surface configured to check whether the fastening bars are sagged or not.

4. The filter assembly of claim 2, wherein each of the filter units includes at least one fastening hole, and the plurality of filter units are fixed to the block frame through one fastening bar passing through the fastening hole.

5. The filter assembly of claim 1, wherein the block frame is provided with at least one handle attachable by a user.

6. The filter assembly of claim 1, wherein each of the filter units includes:
a filter member formed in a plate shape having a certain area;
a support frame which is coupled to an edge side of the filter member such that the filter member is maintained in the plate shape and includes a flow path therein through which the filtered water produced through the filter member is introduced and moves; and
at least one receiving port configured to discharge the filtered water introduced into the flow path to an outside of the filter unit.

7. The filter assembly of claim 6, wherein the filter member includes a first support and a nanofiber web formed of nanofibers on both sides of the first support.

8. The filter assembly of claim 1, wherein the fixing frame includes at least two guide rails configured to support a lower edge side of the plate-type filter module for water treatment and guide a sliding movement of the plate-type filter module for water treatment, and a bar-shaped guide bar is provided on the side of the guide rail along a sliding direction of the filter module to reduce a contact area with the plate-type filter module for water treatment.

9. The filter assembly of claim 8, wherein the guide bar has a front end formed with an inclined surface to allow the plate-type filter module for water treatment to easily slide in.

10. The filter assembly of claim 1, wherein a first through hole and a second through hole are formed to pass through the block frame and the fixing frame, in the regions corresponding to each other, to allow a fastening member to pass simultaneously therethrough, and the sliding movement of the filter module is restricted through the fastening member simultaneously inserted into the first through hole and the second through hole.

11. The filter assembly of claim 1, further comprising an air diffuser disposed on a lower portion of the plate-type filter module for water treatment and configured to eject bubbles toward the plate-type filter module for water treatment using air supplied from outside of the filter assembly.

12. The filter assembly of claim 11, wherein the air diffuser is provided with a hollow tube having a plurality of ejection holes and is mounted on the fixing frame.

13. The filter assembly of claim 11, wherein the air diffuser is provided in a plate shape having pores of a certain size.

14. The filter assembly of claim 13, wherein the air diffuser is detachably coupled to the block frame.

15. The filter assembly of claim 11, wherein the air diffuser includes a nanofiber web having micropores.

* * * * *